US012689439B2

(12) United States Patent (10) Patent No.: US 12,689,439 B2

Tochio (45) Date of Patent: Jul. 21, 2026

(54) OPTICAL TRANSMISSION DEVICE AND OPTICAL TRANSMISSION SYSTEM

(71) Applicant: 1FINITY Inc., Kawasaki (JP)

(72) Inventor: Yuji Tochio, Yokohama (JP)

(73) Assignee: 1FINITY Inc., Kawasaki (JP)

( * ) Notice: Subject to any disclaimer, the term of this patent is extended or adjusted under 35 U.S.C. 154(b) by 289 days.

(21) Appl. No.: 18/644,194

(22) Filed: Apr. 24, 2024

(65) Prior Publication Data

US 2024/0396634 A1 Nov. 28, 2024

(30) Foreign Application Priority Data

May 25, 2023 (JP) ................................. 2023-085899

(51) Int. Cl.
*H04B 10/25* (2013.01)

(52) U.S. Cl.
CPC .................................... *H04B 10/25* (2013.01)

(58) Field of Classification Search
CPC ........ H04B 10/50; H04B 10/25; H04B 10/27; H04J 14/08; H04J 3/1652; H04J 3/167; H04J 3/1658; H04J 3/1664
See application file for complete search history.

(56) References Cited

U.S. PATENT DOCUMENTS

| 2013/0202294 A1 | 8/2013 | Fu et al. |
| 2016/0056886 A1* | 2/2016 | Kitamura ........... H04Q 11/0005 |
| | | 398/19 |
| 2020/0059712 A1 | 2/2020 | Satyarthi et al. |
| 2022/0278767 A1* | 9/2022 | Tochio ................... H04B 10/50 |

FOREIGN PATENT DOCUMENTS

| JP | 2012-239048 A | 12/2012 |
| JP | 2013-524560 A | 6/2013 |
| JP | 2022-133227 A | 9/2022 |

* cited by examiner

*Primary Examiner* — Hibret A Woldekidan

(74) *Attorney, Agent, or Firm* — Fujitsu Intellectual Property Center

(57) ABSTRACT

Optical transmission device includes: first frame generator, second frame generator and transmission circuits. The first frame generator generates first frame. The second frame generator generates one or a plurality of second frames from the first frame. The number of the second frames corresponds to bandwidth of the first frame. The transmission circuits transmit the second frames. When specified bit pattern is transmitted to second optical transmission device, (1) the first frame generator generates third frame including the specified bit pattern, bandwidth of the third frame being equal to or smaller than bandwidth of the second frame, (2) the second frame generator generates fourth frame having the same format as a format of the second frame, the third frame being accommodated in the fourth frame, and (3) the fourth frame is transmitted to the second optical transmission device by selected one of the transmission circuits.

8 Claims, 22 Drawing Sheets

OPTICAL TRANSMISSION DEVICE AND OPTICAL TRANSMISSION SYSTEM

CROSS-REFERENCE TO RELATED APPLICATION

This application is based upon and claims the benefit of priority of the prior Japanese Patent Application No. 2023-085899, filed on May 25, 2023, the entire contents of which are incorporated herein by reference.

FIELD

The embodiments discussed herein are related to an optical transmission device and an optical transmission system that transmit a frame.

BACKGROUND

An optical transport network (OTN) has been widely put into practical use as one of techniques for implementing large-capacity optical communication. The OTN is defined in ITU-T Recommendations G.709. Further, in the OTN, FlexO (or OTUCn) has been proposed as one of techniques for transmitting traffic exceeding 100 G. The Flexo is defined in ITU-T Recommendations G.709.1 and G709.3. It is noted that, in the Flexo, traffic exceeding 100 G is transmitted by using an optical component for transmitting 100 G traffic. Further, the Flexo that transmits 200 G/400 G/800 G traffic has also been proposed.

In order to perform setting or maintenance of an OTN communication system, a lock (LCK) function is defined in G.709. LCK is configured such that a path of a specified layer (for example, an optical channel data unit (ODU)) cannot be used in response to an instruction from an operator of f the OTN communication system. At this time, an LCK signal having a specified bit pattern is transmitted to a reception node. Then, the reception node that has received the LCK signal shifts to a maintainable state while suppressing an unnecessary alarm.

It is noted that, as a related technique, proposed is a technique that suppresses an influence relating to stopping of a communication service at the time of updating an optical transmission device that transmits a frame (for example, Japanese Laid-Open Patent Publication No. 2022-133227 and US Patent Publication No. 2022/0278767). The LCK is described, for example, in US Patent Publication No. 2020/0059712.

As described above, a procedure of transmitting the LCK signal is known in order to perform setting or maintenance of the OTN communication system. However, in the conventional procedure, the LCK signal may be excessively transmitted. In this case, power consumption of a communication device increases. It is noted that this problem is not limited to the case of transmitting the LCK signal, and may also occur in the case of transmitting a signal related to setting or maintenance of the communication system.

SUMMARY

According to an aspect of the embodiments, an optical transmission device is used in an optical transmission system that transmits a frame. The optical transmission device includes: a first frame generator configured to generate a first frame; a second frame generator configured to generate one or a plurality of second frames from the first frame, the number of second frames corresponding to a bandwidth of the first frame; and a plurality of transmission circuits configured to transmit the second frames generated by the second frame generator. When a specified bit pattern is transmitted to a second optical transmission device, the first frame generator generates a third frame including the specified bit pattern, a bandwidth of the third frame being equal to or smaller than a bandwidth of the second frame, the second frame generator generates a fourth frame having the same format as a format of the second frame, the third frame being accommodated in the fourth frame, and the fourth frame is transmitted to the second optical transmission device by a first transmission circuit selected from the plurality of transmission circuits.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An optical transport network (OTN) interface defined in ITU-T Recommendations G.709 is applied to an optical transmission device that implements long-distance and/or large-capacity optical communication. An OTN accommodates any client signal in a frame of a specified format. In addition, the OTN provides a function (that is, a multiple accommodation function) of accommodating a plurality of frames in a higher-speed frame.

Figure 1:
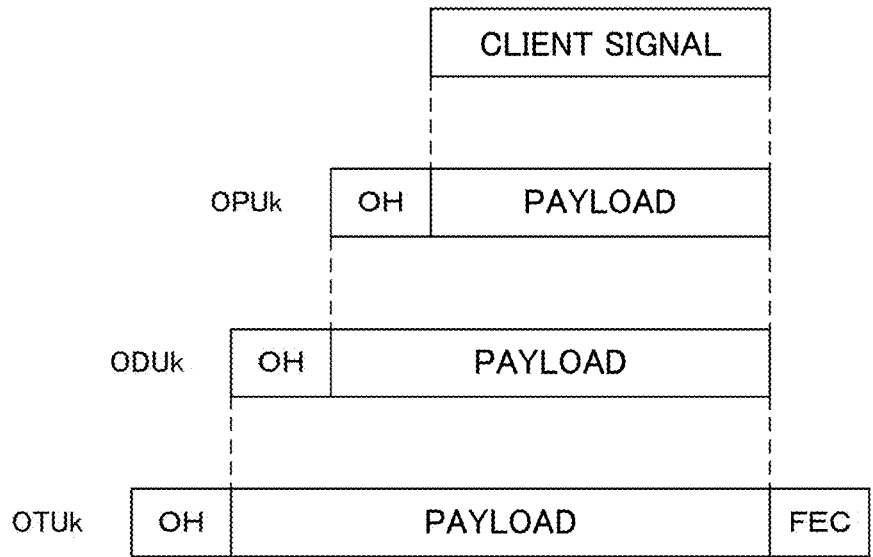
FIG. 1 illustrates a frame structure of an OTN.

FIG. 1 illustrates a frame structure of the OTN. In the OTN, a client signal is accommodated in a payload of an optical channel payload unit-k (OPUk) frame. k identifies a transmission rate. The OPUk frame has an OPU overhead. The OPUk frame is accommodated in a payload of an optical channel data unit-k (ODUk) frame. The ODUk frame has an ODU overhead. The ODUk frame is accommodated in a payload of an optical channel transport unit-k (OTUk) frame. The OTUk frame has an OTU overhead. Further, an error correction code FEC is added to the OTUk frame. It is noted that the OTUk frame is a fixed-length frame.

In recent years, with an increase in speed of the client signal, an OTN (B100 G: beyond 100 G) exceeding 100 Gbps has been studied. In the B100 G, not only large-capacity transmission but also flexibility is considered. Therefore, an OTUCn frame in which n OTUC frames are multiplexed is defined. Further, in ITU-T Recommendations G. 709.1, a flexible OTN (FlexO) that multiplexes a plurality of physical interfaces is defined. A signal accommodated in the Flexo is, for example, an OTUCn.

Figure 2:
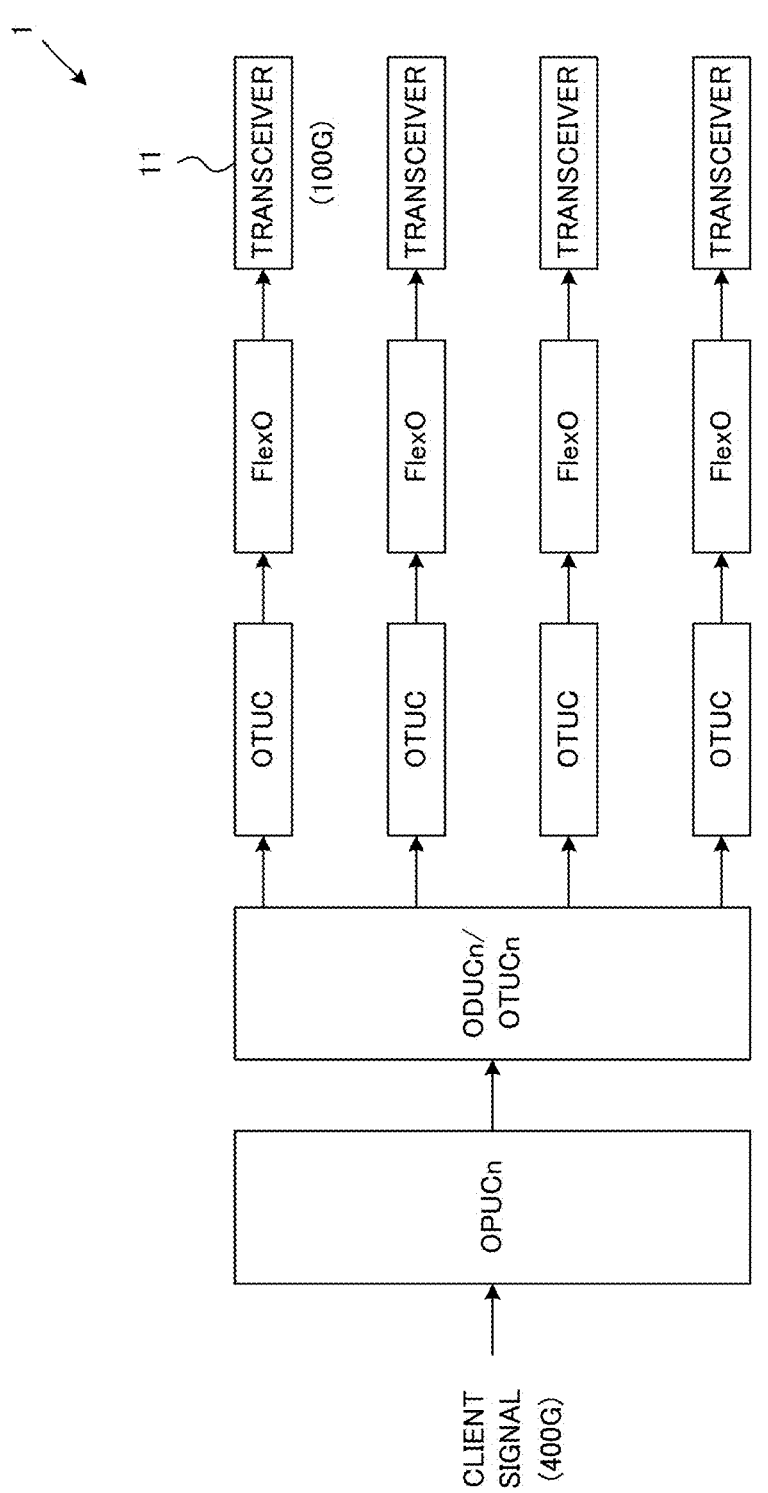
FIG. 2 illustrates an example of a flow of a signal in an optical transmission device.

FIG. 2 illustrates an example of a flow of a signal in the optical transmission device. It is noted that FIG. 2 illustrates a flow of signals in a transmission circuit that transmits a frame accommodating a client signal to a network. That is, in FIG. 2, a reception circuit that receives the frame from the network is omitted.

The client signal is input to an optical transmission device 1. The client signal is accommodated in an OPUCn frame. The OPUCn frame is accommodated in an ODUCn frame, and further, the ODUCn frame is accommodated in an OTUCn frame. Thereafter, Flexo process is performed. That is, n OTUC frames forming the OTUCn frame are each accommodated in a FlexO frame. Then, a transceiver outputs, to the network, an optical signal that transmits the Flexo frames.

In this example, it is assumed that the total bandwidth of the client signals is 400 G. In this case, n is 4, and four OTUC frames are respectively accommodated in the payloads of the FlexO frames. That is, four FlexO frames are generated. Then, each transceiver 11 transmits the FlexO frame. It is noted that each transceiver 11 can transmit the optical signal of 100 G.

Meanwhile, performance of components in the optical transmission device has been improved. For example, the speed of optical components implemented in the transceiver has been increased. Therefore, the optical transmission device can be configured with a smaller number of components.

Figure 3:
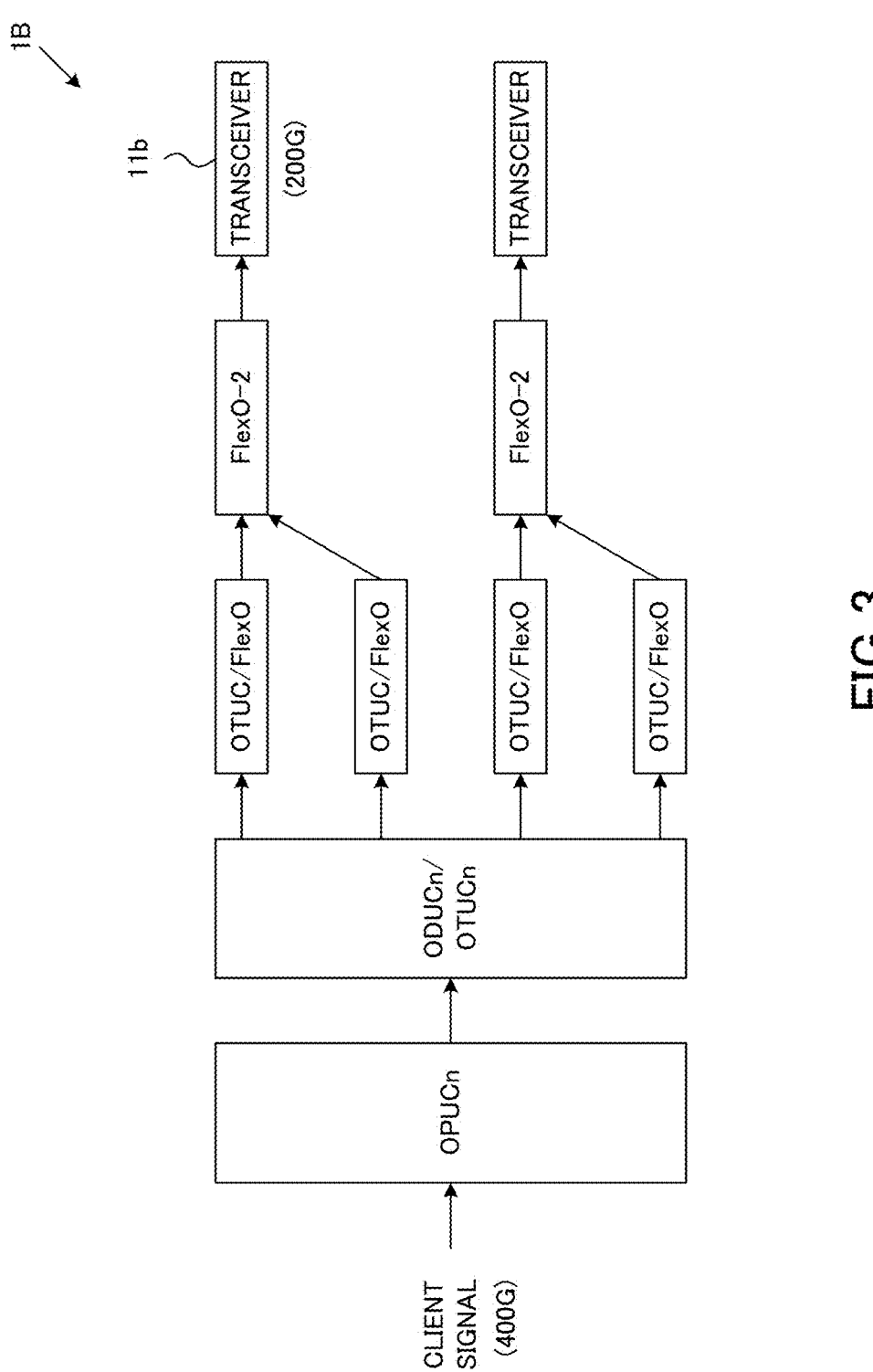
FIG. 3 illustrates another example of a flow of a signal in the optical transmission device.

FIG. 3 illustrates another example of a flow of a signal in the optical transmission device. It is noted that a method of generating the n FlexO frames accommodating the client signals is substantially the same in FIG. 2 and FIG. 3.

In an optical transmission device 1B illustrated in FIG. 3, a FlexO-x frame is generated by combining a plurality of FlexO frames. In this example, two FlexO frames are combined to generate a FlexO-2 frame. That is, x is 2. At this time, interleaving is performed as necessary. Further, an error correction code FEC is added to the FlexO-2 frame. Then, a transceiver 11b transmits the FlexO-2 frame to a network. In this example, each transceiver 11b can transmit the optical signal of 200 G.

As described above, in the configuration illustrated in FIG. 3, the number of ports included in the optical transmission device is reduced as compared with the configuration illustrated in FIG. 2. In addition, in a case where the optical transmission devices 1 and 1B are WDM transmission devices and different wavelengths are allocated to the respective transceivers, in the configuration illustrated in FIG. 3, utilization efficiency of wavelength resources is improved as compared with the configuration illustrated in FIG. 2.

Figure 4:
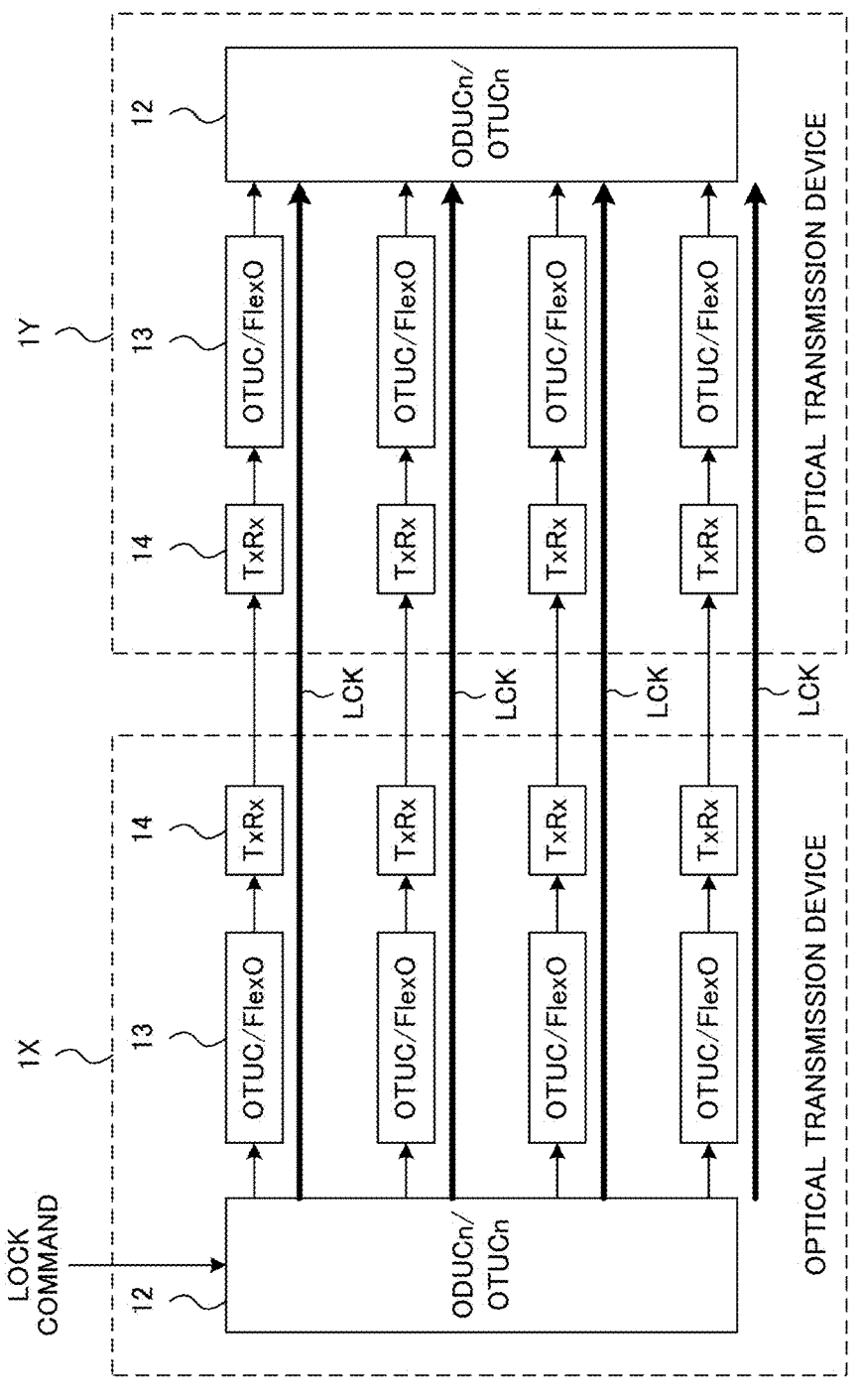
FIG. 4 illustrates an example of transmission of an LCK signal.

FIG. 4 illustrates an example of transmission of an LCK signal. The LCK signal is one of maintenance signals of an ODU layer and has a specified bit pattern. In this example, an optical transmission system includes an optical transmission device 1X and an optical transmission device 1Y. The optical transmission system transmits the ODUCn frame by using the FlexO. Specifically, the ODUCn frame is transmitted by using n Flexo frames. Therefore, each optical transmission device (1X, 1Y) includes frame generators that correspond to an ODUCn/OTUCn processor 12, n OTUC/Flexo processors 13, and n transceivers (TxRX) 14. It is noted that, in the example illustrated in FIG. 4, n is 4.

In the optical transmission device 1X, the ODUCn/OTUCn processor 12 accommodates the ODUCn frame in the OTUCn frame, and generates n OTUC frames from the OTUCn frame. Each OTUC/FlexO processor 13 generates the FlexO frame from the OTUC frame. Then, each transceiver 14 outputs an optical signal that transmits the FlexO frame.

In the optical transmission device 1Y, each transceiver 14 reproduces the FlexO frame from the received optical signal. Each OTUC/Flexo processor 13 extracts the OTUC frame from the FlexO frame. The ODUCn/OTUCn processor 12 reproduces the OTUCn frame from n OTUC frames, and extracts the ODUCn frame from the OTUCn frame.

In the optical transmission system having the above-described configuration, an operator (alternatively, a network administrator) gives a LOCK command to the optical transmission device 1X. Then, the optical transmission device 1X transmits an LCK signal toward a terminal node. Here, the LCK signal is transmitted in the ODU layer. Therefore, in the optical transmission device 1X, an instruction regarding the LOCK command is given to the ODUCn/OTUCn processor 12.

Figure 5:
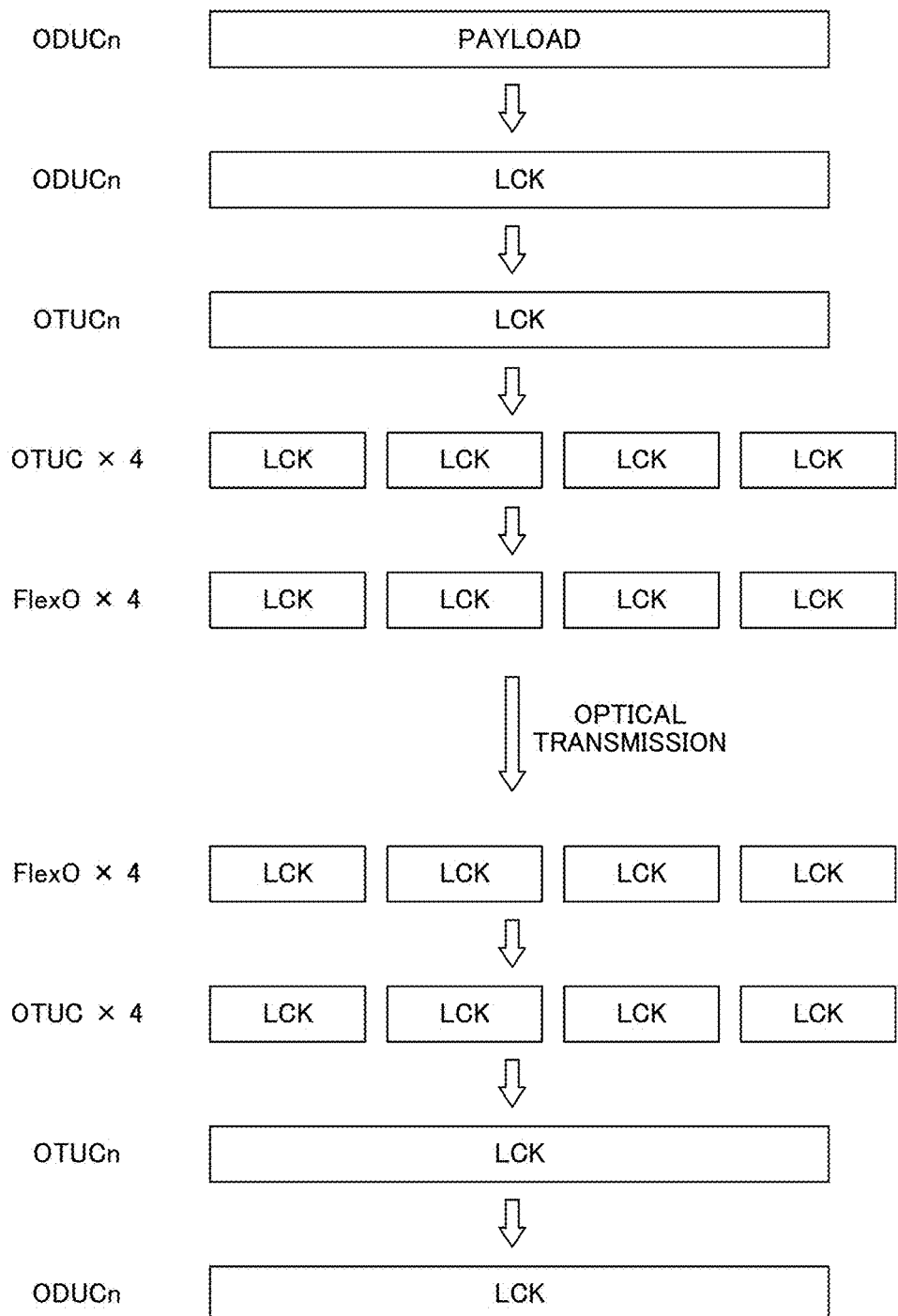
FIG. 5 is a diagram explaining a transmission method illustrated in FIG. 4.

As illustrated in FIG. 5, the ODUCn/OTUCn processor 12 writes a specified repetition pattern in the payload of the ODUCn frame. That is, the ODUCn frame in which the specified repetition pattern is written in the payload is generated. The specified repetition pattern is, for example, "01010101". It is noted that the repetition pattern transmitted due to the LOCK command may be referred to as the "LCK signal".

The optical transmission device 1X transmits the ODUCn frame to the optical transmission device 1Y. At this time, as illustrated in FIG. 5, the ODUCn frame is accommodated in the OTUCn frame, the OTUCn frame is converted into n OTUC frames, and the n OTUC frames are converted into n FlexO frames. Then, the n FlexO frames are transmitted in parallel from the optical transmission device 1X to the optical transmission device 1Y.

As illustrated in FIG. 5, the optical transmission device 1Y extracts n OTUC frames from the received n FlexO frames, reproduces the OTUCn frame from the n OTUC frames, and extracts the ODUCn frame from the OTUCn frame. Then, upon detecting the LCK signal in the payload of the ODUCn frame, the optical transmission device 1Y recognizes that maintenance of an ODU path is performed, and locks processing related to the ODU path.

In this manner, when one ODU frame (that is, the ODUCn frame) is transmitted by using a plurality of FlexO frames, the LCK signals are transmitted through n paths, respectively. In the example illustrated in FIG. 4, the LCK signals are respectively transmitted through four paths. In this case, in the optical transmission device 1X, four OTUC/FlexO processors 13 and four transceivers 14 operate to respectively transmit the LCK signals, and in the optical transmission device 1Y, four OTUC/FlexO processors 13 and four transceivers 14 operate to respectively receive the LCK signals. Therefore, power consumption of each optical transmission device increases.

Embodiments

Figure 6:
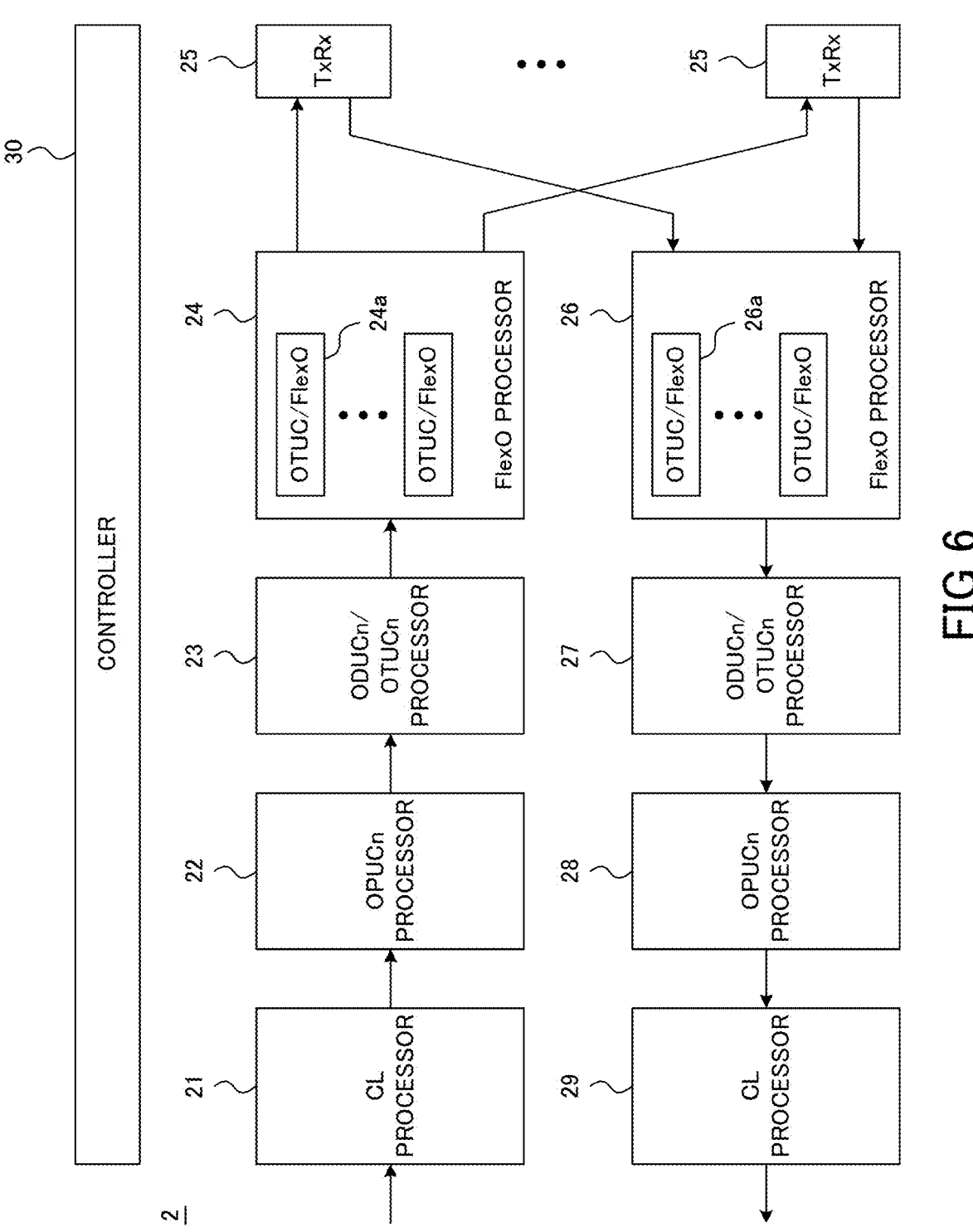
FIG. 6 illustrates an example of a configuration of an optical transmission device according to an embodiment of the present disclosure.
Figure 7A:
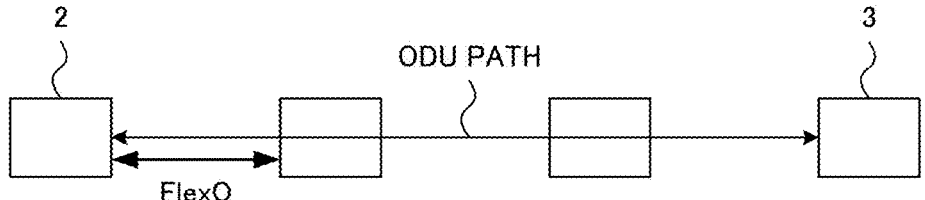
FIGS. 7A to 7C illustrate examples of a network configuration.

FIG. 6 illustrates an example of a configuration of an optical transmission device according to an embodiment of the present disclosure. An optical transmission device 2 according to the embodiment of the present disclosure is provided at an end of the ODU path, as illustrated in FIG. 7A. The optical transmission device 2 supports the FlexO.

The optical transmission device 2 includes a client processor 21, an OPUCn processor 22, an ODUCn/OTUCn processor 23, a Flexo processor 24, a transceiver 25, a FlexO processor 26, an ODUCn/OTUCn processor 27, an OPUCn processor 28, a client processor 29, and a controller 30. It is noted that the optical transmission device 2 may include other circuits or functions not illustrated in FIG. 6.

The client processor 21 terminates a client signal generated by a client. It is noted that the client processor 21 includes a plurality of input ports. Each input port is provided with a transceiver (not illustrated). The OPUCn processor 22 accommodates the client signal in the OPUCn frame. The ODUCn/OTUCn processor 23 accommodates the OPUCn frame in the ODUCn frame, and further accommodates the ODUCn frame in the OTUCn frame. Then, the ODUCn/OTUCn processor 23 generates n OTUC frames from the OTUCn frame. The Flexo processor 24 includes n OTUC/Flexo processors 24a. Each OTUC/FlexO processor 24a accommodates the OTUC frame in the FlexO frame. That is, n FlexO frames are generated in the Flexo processor 24.

For example, when the bandwidth of the ODUCn frame is 400 Gbps, and the bandwidth of the FlexO frame is 100 Gbps, the ODUCn frame is transmitted by using four FlexO frames. That is, the number of FlexO frames corresponding to the bandwidth (alternatively, the transmission rate) of the ODUCn frame is generated.

The transceiver 25 transmits the FlexO frame generated by the Flexo processor 24 to the network. In addition, the transceiver 25 terminates an optical signal received through the network. It is noted that the optical transmission device includes the n/x transceivers 25. For example, in the configuration illustrated in FIG. 2, since n is 4 and x is 1, the optical transmission device includes four transceivers 25. In the configuration illustrated in FIG. 3, since n is 4 and x is 2, the optical transmission device includes two transceivers 25. In the following description, an example will be described with x is 1.

The Flexo processor 26 includes n OTUC/FlexO processors 26a. Each OTUC/Flexo processor 26a reproduces the FlexO frame from each received signal. In addition, each OTUC/FlexO processor 26a extracts the OTUC frame from the Flexo frame. That is, n OTUC frames are reproduced in the Flexo processor 26. The ODUCn/OTUCn processor 27 reconfigures the OTUCn frame from n OTUC frames, and extracts the ODUCn frame from the OTUCn frame. Further, the ODUCn/OTUCn processor 27 extracts the OPUCn frame from the ODUCn frame. The OPUCn processor 28 extracts a client signal from the OPUCn frame. The client processor 29 transmits the client signal to the corresponding client. It is noted that the client processor 29 includes a plurality of output ports. Each output port is provided with a transceiver (not illustrated).

The controller 30 controls the client processor 21, the OPUCn processor 22, the ODUCn/OTUCn processor 23, the FlexO processor 24, the transceiver 25, the Flexo processor 26, the ODUCn/OTUCn processor 27, the OPUCn processor 28, and the client processor 29. The configuration and processing of the controller 30 will be described with reference to FIG. 8.

Figure 8:
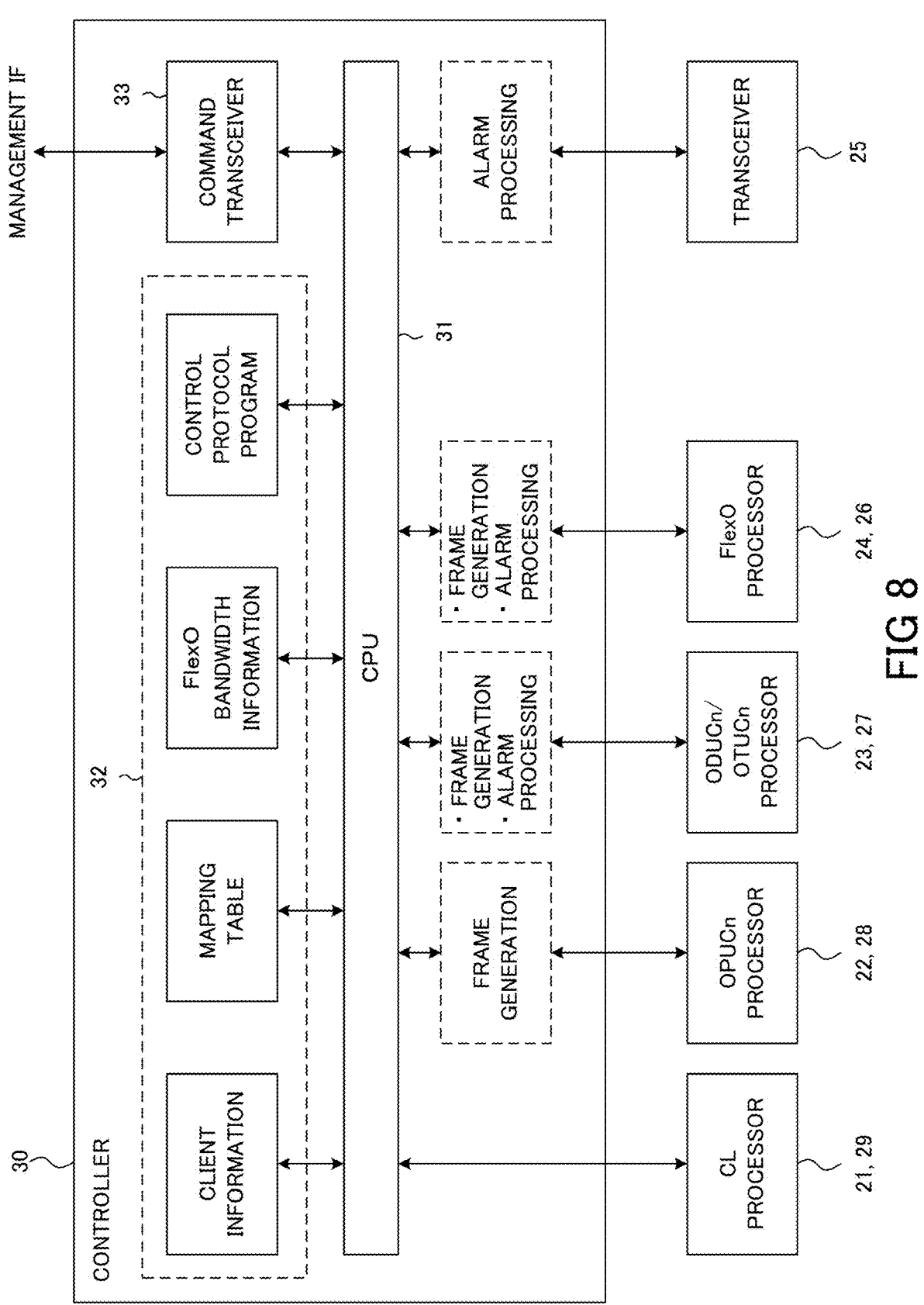
FIG. 8 illustrates an example of a controller.

FIG. 8 illustrates an example of the controller 30. The controller 30 includes a processor (CPU) 31, a memory 32, and a command transceiver 33. It is noted that the controller 30 may include a circuit or a function not illustrated in FIG. 8.

The processor 31 controls the operation of the optical transmission device 2 by executing a control program stored in the memory 32. Various control information is stored in the memory 32. Client information includes information indicating a bandwidth of each client signal, information indicating the priority of each client signal, and the like. In a mapping table, information for mapping each client signal to a tributary slot is stored. It is noted that the tributary slot is an example of a time slot that accommodates the client signal. Flexo bandwidth information represents a bandwidth of the FlexO-x frame. In this example, x is 1. Furthermore, although not illustrated, information for generating an overhead and the like are stored in the memory 32.

The command transceiver 33 receives a control command through a management interface. The control command is generated by a network administrator. In addition, the control command includes a command to stop or start each component implemented in the optical transmission device 2. Further, the control command includes a LOCK command (MI administrate) for transmitting the LCK signal. When the command transceiver 33 receives the control command, the processor 31 controls the operation of the optical transmission device 2 according to the control command.

It is noted that the OPUCn processor 22, the ODUCn/OTUCn processor 23, the Flexo processor 24, the Flex processor 26, the ODUCn/OTUCn processor 27, and the OPUCn processor 28 each include, for example, a write circuit that writes a signal to a memory and a read circuit that reads a signal from the memory. In this case, the write circuit is a hardware circuit, and writes an input signal to an address corresponding to an instruction given from the controller 30. Furthermore, the read circuit is a hardware circuit, and reads a signal from an address corresponding to an instruction given from the controller 30. However, some of the functions of the OPUCn processor 22, the ODUCn/OTUCn processor 23, the FlexO processor 24, the FlexO processor 26, the ODUCn/OTUCn processor 27, and the OPUCn processor 28 may be implemented by software.

Figure 9:
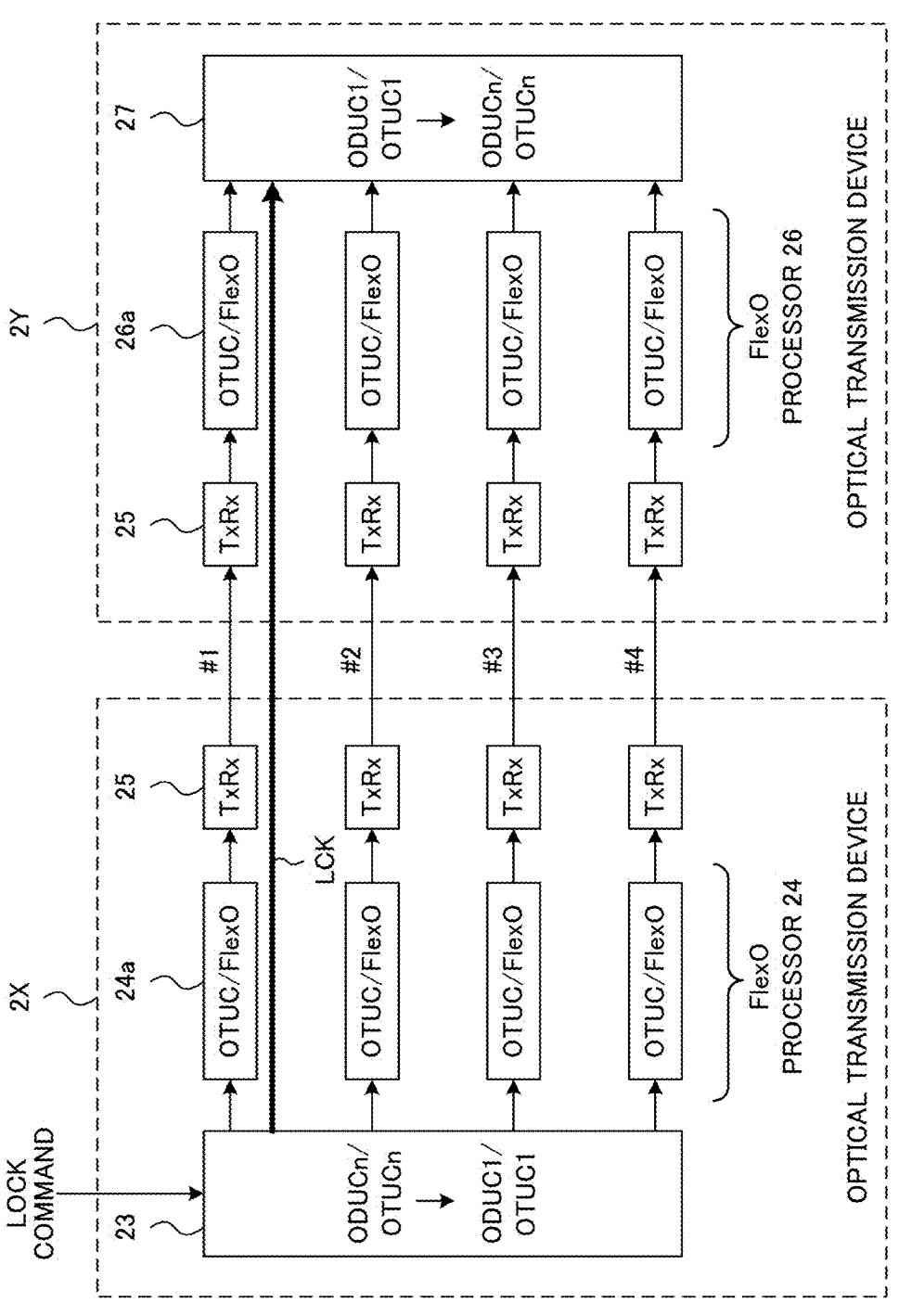
FIG. 9 illustrates an example of transmission of an LCK signal according to the embodiment of the present disclosure.

FIG. 9 illustrates an example of transmission of the LCK signal in the embodiment of the present disclosure. In this example, the optical transmission system includes an optical transmission device 2X and an optical transmission device 2Y. The optical transmission devices 2X and 2Y correspond to the optical transmission device 2 illustrated in FIG. 6. In addition, the optical transmission system transmits the ODUCn frame by using the Flexo. Specifically, the ODUCn frame is transmitted by using n Flexo frames. Therefore, each optical transmission device (2X, 2Y) includes the ODUCn/OTUCn processors 23 and 27, the Flexo processors 24 and 26, and n transceivers (TxRx) 25. The Flexo processor 24 includes n OTUC/FlexO processors 24a, and the Flexo processor 26 includes n OTUC/FlexO processors 26a. It is noted that, in the example illustrated in FIG. 9, n is 4. Furthermore, in FIG. 9, the client processor (21, 29) and the OPUCn processor (22, 28) are omitted.

In the optical transmission device 2x, the ODUCn/OTUCn processor 23 accommodates the ODUCn frame in the OTUCn frame, and generates n OTUC frames from the OTUCn frame. Each OTUC/FlexO processor 24a generates the FlexO frame from the OTUC frame. Then, each transceiver 25 outputs an optical signal that transmits the Flexo frame.

In the optical transmission device 2Y, each transceiver 25 reproduces the FlexO frame from the received signal. Each OTUC/Flexo processor 26a extracts the OTUC frame from the FlexO frame. The ODUCn/OTUCn processor 27 reproduces the OTUCn frame from n OTUC frames, and extracts the ODUCn frame from the OTUCn frame.

In the optical transmission system having the above-described configuration, an operator (alternatively, a network administrator) gives a LOCK command to the optical transmission device 2X. Then, the optical transmission device 2X transmits the LCK signal toward a terminal node. Here, the LCK signal is transmitted through the ODU layer. Therefore, in the optical transmission device 2X, an instruction caused by the LOCK command is given to the ODUCn/OTUCn processor 23.

Figure 10:
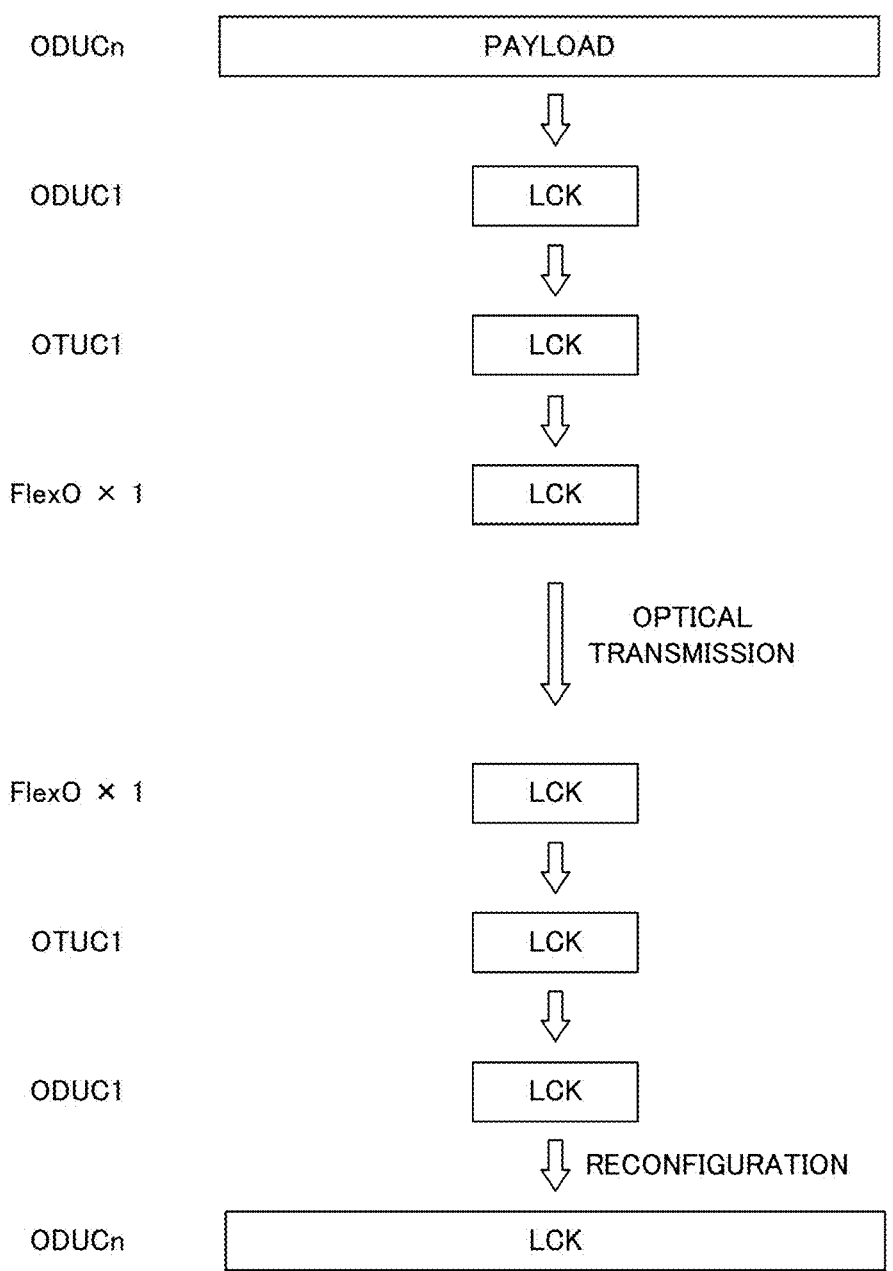
FIG. 10 is a diagram explaining a transmission method illustrated in FIG. 9.

Upon receiving the LOCK command, the ODUCn/OTUCn processor 23 switches its operation mode from "n=4" to "n=1". That is, the ODUCn/OTUCn processor 23 operates as an ODUC1/OTUC1 circuit. At this time, the ODUCn/OTUCn processor 23 may substantially change a speed of an operation clock to, for example, 1/4. Then, the ODUCn/OTUCn processor 23 generates an ODUC1 frame, as illustrated in FIG. 10. The LCK signal is written in the payload of the ODUC1 frame. As described above, the LCK signal represents a specified repetition pattern (for example, 01010101). It is noted that a bandwidth (alternatively, the transmission rate) of the ODUC1 frame is substantially the same as that of the FlexO frame, and is about 100 Gbps. That is, the ODUC1 frame is an example of a frame that has a bandwidth that can be accommodated in the Flexo frame and includes a specified bit pattern.

The optical transmission device 2X transmits the ODUC1 frame to the optical transmission device 2Y. In this example, as illustrated in FIG. 10, the ODUC1 frame is accommodated in an OTUC1 frame, and the OTUC1 frame is accommodated in the Flexo frame. Then, the FlexO frame is transmitted from the optical transmission device 2X to the optical transmission device 2Y. At this time, one of the four OTUC/FlexO processors 24a is used, and one of the four transceivers 25 is used. That is, in the optical transmission device 2X, each of the three OTUC/FlexO processors 24a and the three transceivers 25 are configured to be a non-operating state. The non-operating state is not particularly limited, but indicates, for example, a state in which a signal is not processed, a state in which a signal is not input, a sleep state, or a state in which power is not provided.

The optical transmission device 2Y receives the optical signal transmitted from the optical transmission device 2X. Then, as illustrated in FIG. 10, the optical transmission device 2Y reproduces the FlexO frame from the received signal, extracts the OTUC1 frame from the FlexO frame, and reproduces the ODUC1 frame from the OTUC1 frame. However, as described above, the optical transmission device 2X transmits the Flexo frame by using one of the plurality of transceivers 25. Therefore, in the optical transmission device 2Y, the corresponding one of the plurality of transceivers 25 receives the optical signal. In addition, one of the plurality of OTUC/FlexO processors 26a extracts the OTUC1 frame from the FlexO frame. That is, in the optical transmission device 2Y, each of the three OTUC/FlexO processors 26a and the three transceivers 25 are configured to be the non-operating state.

Thereafter, the ODUCn/OTUCn processor 27 reconfigures the ODUCn frame from the ODUC1 frame. Here, the bit pattern of the LCK signal is known. Therefore, the ODUCn/OTUCn processor 27 can reproduce the ODUCn frame transmitted from the optical transmission device 2X by writing the LCK signal in the entire payload of the ODUCn frame. Then, the overhead of the ODUCn frame may be the same as the overhead of the ODUC1 frame. Then, upon detecting the LCK signal from the payload of the ODUCn frame, the optical transmission device 2Y recognizes that maintenance of the ODU path is performed, and locks processing related to the ODU path.

As described above, in the embodiment of the present disclosure, even in a configuration in which one ODU frame (that is, ODUCn frame) is transmitted by using a plurality of Flexo frames, the LCK signal is transmitted through only one path, as illustrated in FIG. 9. At this time, in the optical transmission device 2X, the three OTUC/Flexo processors 24a and the three transceivers 25 are configured to be the non-operating state. In addition, in the optical transmission device 2Y, the three OTUC/FlexO processors 26a and the three transceivers 25 are configured to be the non-operating state. Therefore, power consumption of each optical transmission device is reduced as compared with the configuration illustrated in FIGS. 4 and 5.

Figure 7B:
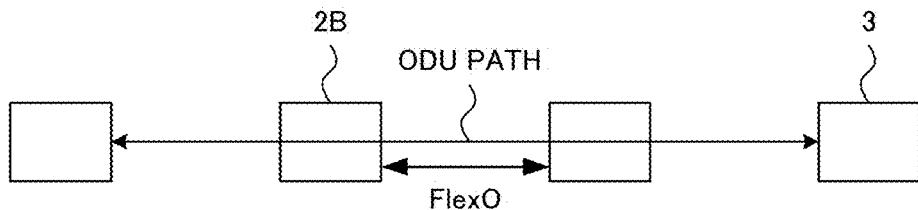
Figure 11:
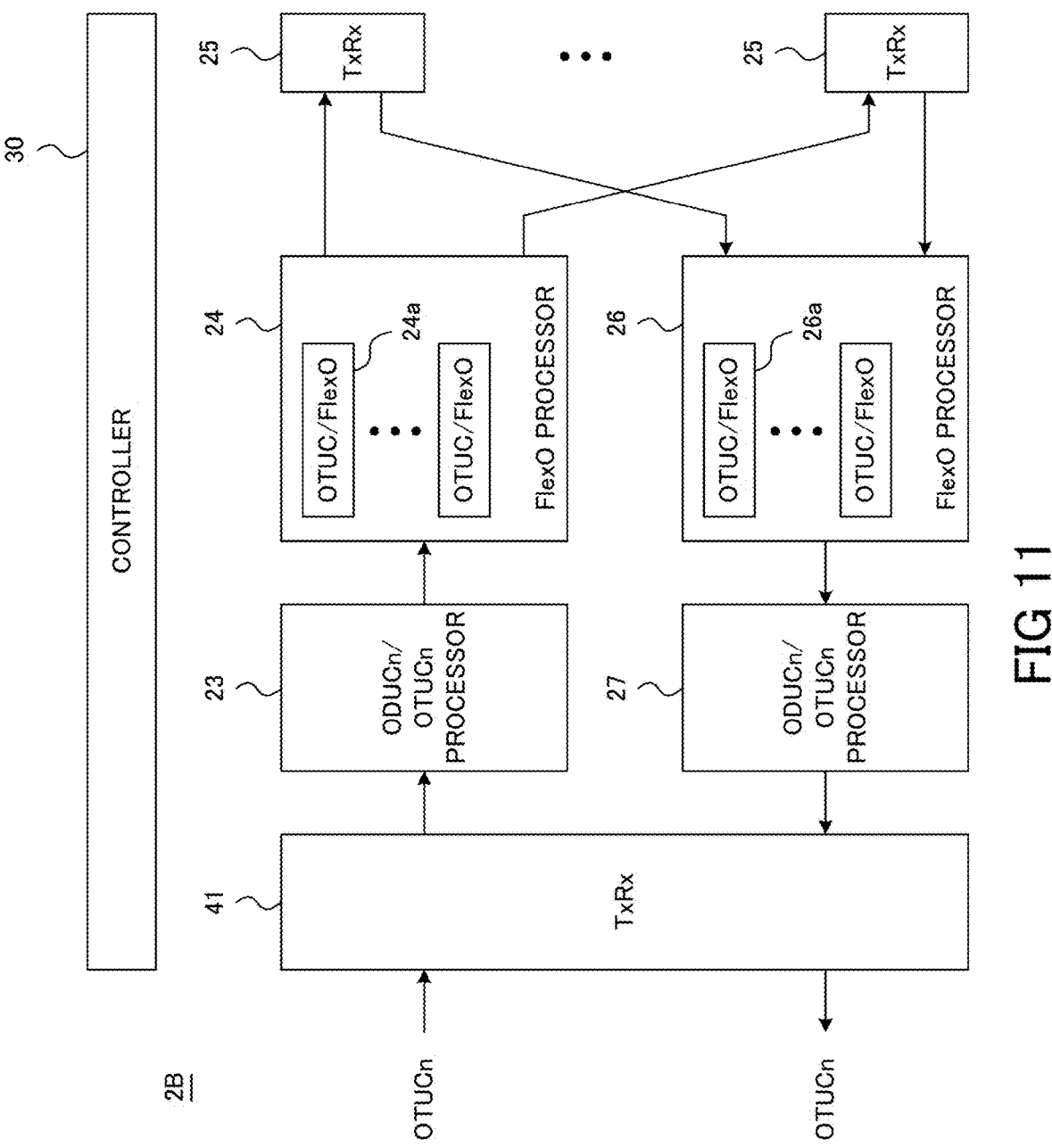
FIG. 11 illustrates another example of the configuration of the optical transmission device according to the embodiment of the present disclosure.

FIG. 11 illustrates another example of the configuration of the optical transmission device according to the embodiment of the present disclosure. An optical transmission device 2B illustrated in FIG. 11 is provided in a relay node, as illustrated in FIG. 7B. However, in two communication interfaces included in the relay node, one communication interface supports the Flexo, but the other communication interface does not support the Flexo.

As illustrated in FIG. 11, the optical transmission device 2B includes the ODUCn/OTUCn processor 23, the FlexO processor 24, the transceiver 25, the Flexo processor 26, the ODUCn/OTUCn processor 27, the controller 30, and a transceiver 41. It is noted that the ODUCn/OTUCn processor 23, the Flexo processor 24, the transceiver 25, the Flexo processor 26, the ODUCn/OTUCn processor 27, and the controller 30 are substantially the same in FIG. 6 and FIG. 11. Furthermore, the optical transmission device 2B may include another circuit or function not illustrated in FIG. 11.

The transceiver 41 receives an optical signal through the communication interface that does not support the Flexo. In addition, the transceiver 41 transmits the optical signal through the communication interface that does not support the FlexO. This communication interface supports, for example, the OTUCn. In this case, the ODUCn/OTUCn processor 23 extracts the OTUCn frame from a signal received by the transceiver 41. Further, the ODUCn/OTUCn processor 27 transmits the OTUCn frame through the transceiver 41.

Figure 12:
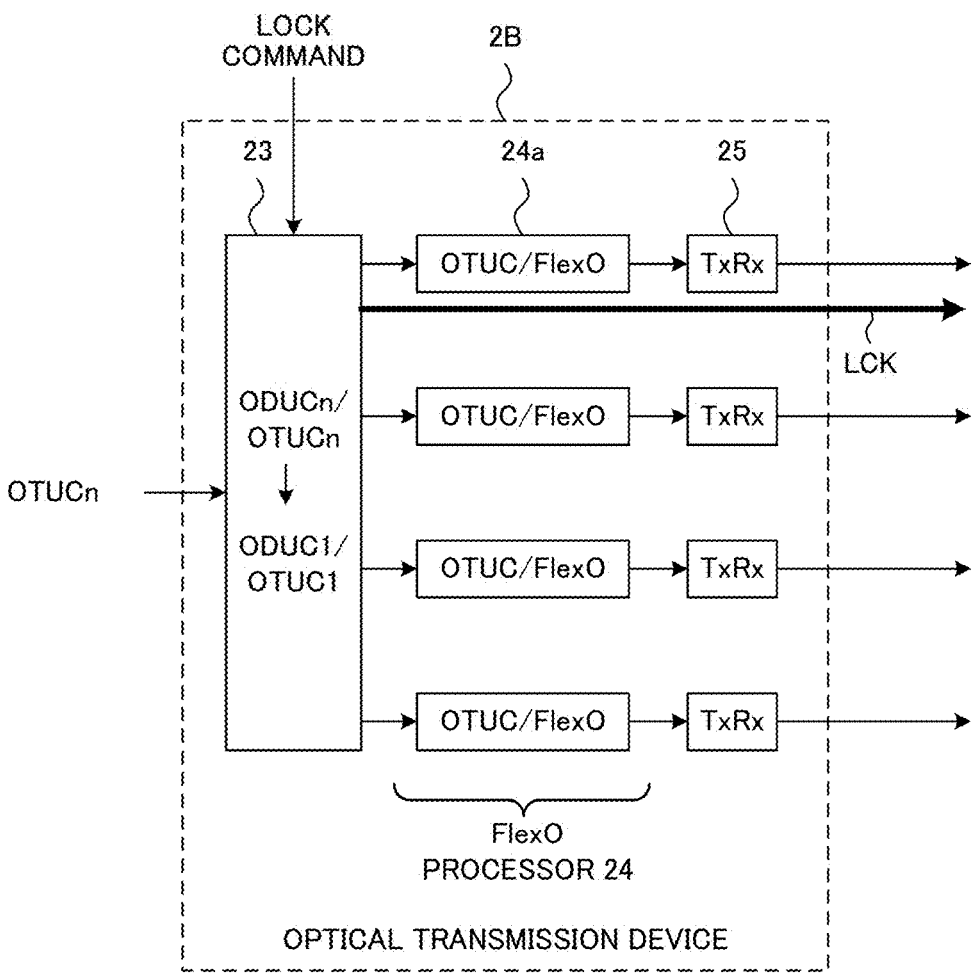
FIG. 12 illustrates an operation when a LOCK command is given to the optical transmission device illustrated in FIG. 11.

FIG. 12 illustrates an operation when the LOCK command is given to the optical transmission device 2B illustrated in FIG. 11. In this example, the optical transmission device 2B receives the OTUCn the frame. Specifically, the optical the OTUCn frame from the transmission device 2B extracts received optical signal. Then, the ODUCn/OTUCn processor 23 first extracts the ODUCn frame from the OTUCn frame. Subsequently, the ODUCn/OTUCn processor 23 generates the ODUC1 frame based on the ODUCn frame. At this time, the ODU overhead of the ODUCn frame may be set to the ODUC1 frame as it is. Then, the ODUCn/OTUCn processor 23 writes the LCK signal in the payload of the ODUC1 frame. The subsequent operation is substantially the same in the optical transmission device 2X illustrated in FIG. 9 and the optical transmission device 2B illustrated in FIG. 12. That is, the optical transmission device 2B transmits the FlexO frame storing the LCK signal by using one OTUC/FlexO processor 24a and one transceiver 25. This Flexo frame is transmitted to the optical transmission device 3 illustrated in FIG. 7B.

Figure 7C:
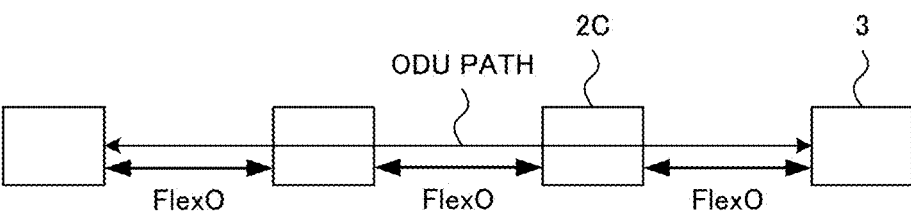
Figure 13:
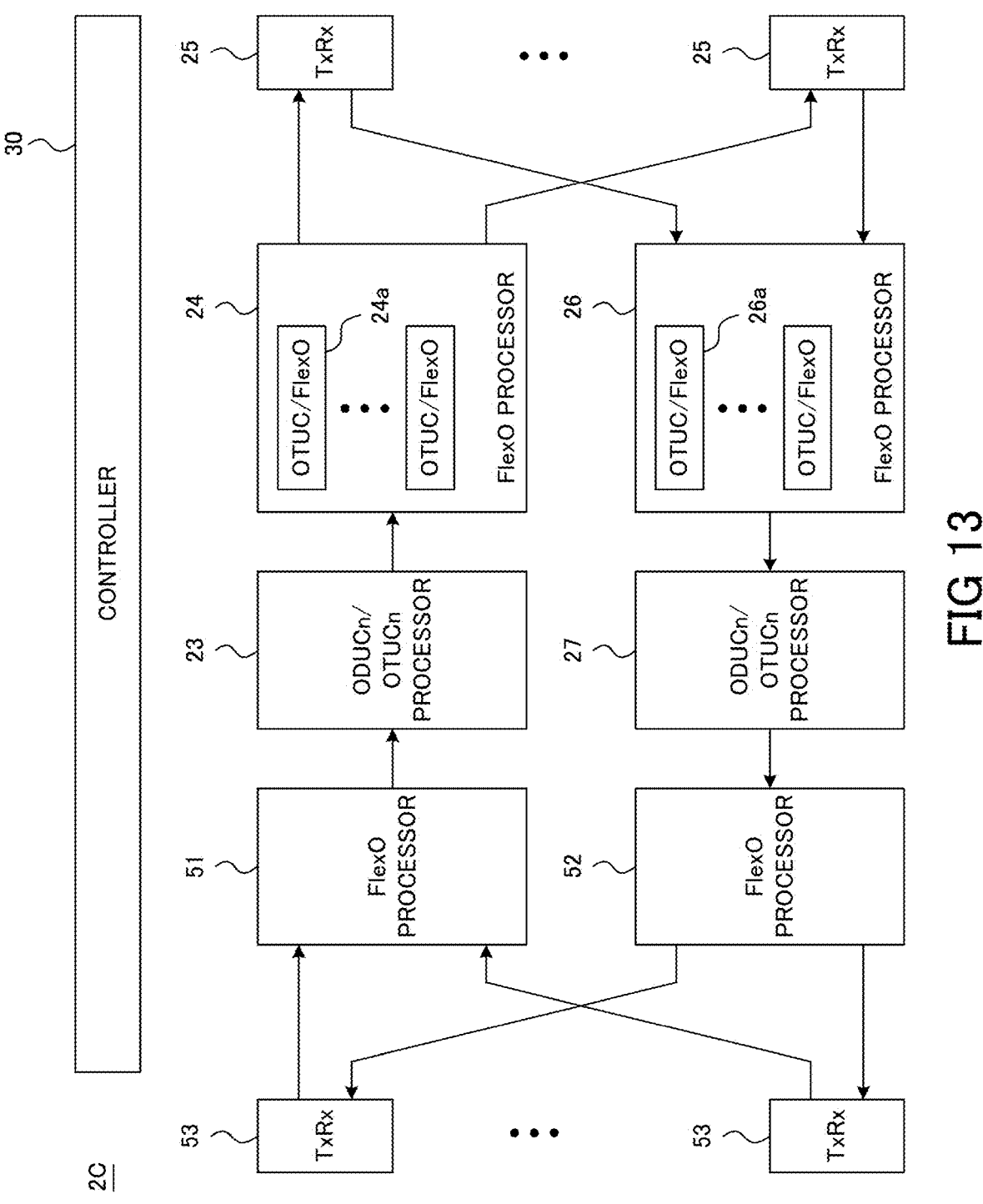
FIG. 13 illustrates still another example of the configuration of the optical transmission device according to the embodiment of the present disclosure.

FIG. 13 illustrates still another example of the configuration of the optical transmission device according to the embodiment of the present disclosure. An optical transmission device 2C illustrated in FIG. 13 is provided in a relay node, as illustrated in FIG. 7C. However, both of the two communication interfaces included in the relay node support the FlexO.

As illustrated in FIG. 13, the optical transmission device 2C includes the ODUCn/OTUCn processor 23, the FlexO processor 24, the transceiver 25, the Flexo processor 26, the ODUCn/OTUCn processor 27, the controller 30, a Flexo processor 51, a Flexo processor 52, and a transceiver 53. It is noted that the ODUCn/OTUCn processor 23, the Flexo processor 24, the transceiver 25, the Flexo processor 26, the ODUCn/OTUCn processor 27, and the controller 30 are substantially the same in FIG. 6 and FIG. 13. Furthermore, the optical transmission device 2C may include another circuit or function not illustrated in FIG. 13.

The Flexo processors 51 and 52 are substantially the same as the Flexo processors 24 and 26. That is, the Flexo processor 51 reproduces the FlexO frame from signals received through the plurality of transceivers 53. Further, the FlexO processor 51 extracts the OTUCn frame from a plurality of FlexO frames. The OTUCn frame is guided to the ODUCn/OTUCn processor 23. Further, the Flexo processor 52 accommodates the OTUCn frame output from the ODUCn/OTUCn processor 27 in a plurality of FlexO frames. Each FlexO frame is transmitted through the corresponding transceiver 53.

Figure 14:
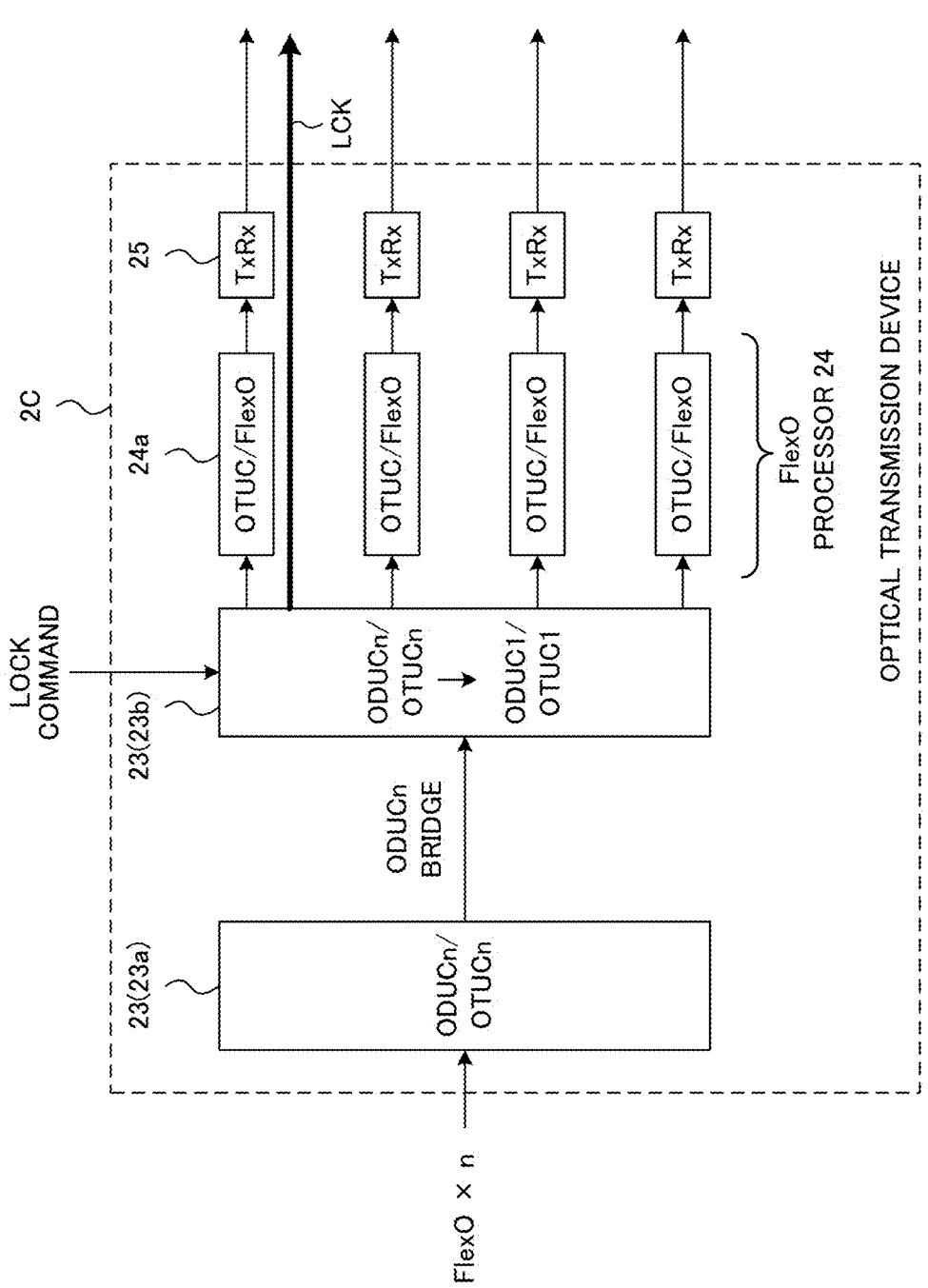
FIG. 14 illustrates an operation when the LOCK command is given to the optical transmission device illustrated in FIG. 13.

FIG. 14 illustrates an operation when the LOCK command is given to the optical transmission device 2C illustrated in FIG. 13. In this example, the optical transmission device 2C receives n FlexO frames. Specifically, the optical transmission device 2C extracts the FlexO frame from each of the n received signals. In addition, the n FlexO frames are reconfigured to the OTUCn frame. Then, the ODUCn/OTUCn processor 23 (23a) extracts the ODUCn frame from the OTUCn frame. This ODUCn frame is guided to the ODUCn/OTUCn processor 23 (23b). It is noted that the ODUCn/OTUCn processor 23a and the ODUCn/OTUCn processor 23b form the ODUCn/OTUCn processor 23 illustrated in FIG. 13.

The ODUCn/OTUCn processor 23 (23b) generates the ODUC1 frame based on the ODUCn frame. At this time, the ODU overhead of the ODUCn frame may be set to the ODUC1 frame as it is. Then, the ODUCn/OTUCn processor 23 writes the LCK signal in the payload of the ODUC1 frame. Subsequent operations are substantially the same in the optical transmission device 2X illustrated in FIG. 9 and the optical transmission device 2C illustrated in FIG. 14. That is, the optical transmission device 2C transmits the FlexO frame storing the LCK signal by using one OTUC/FlexO processor 24a and one transceiver 25. This FlexO frame is transmitted to the optical transmission device 3 illustrated in FIG. 7C.

It is noted that the optical transmission device 2C can transmit the LCK signal toward both ODU terminals. For example, in the optical transmission device 2C illustrated in FIG. 13, by giving the LOCK command to the ODUCn/OTUCn processor 23, the LCK signal is transmitted to one ODU terminal through the transceiver 25, and by giving the LOCK command to the ODUCn/OTUCn processor 27, the LCK signal is transmitted to the other ODU terminal through the transceiver 53.

Figure 15:
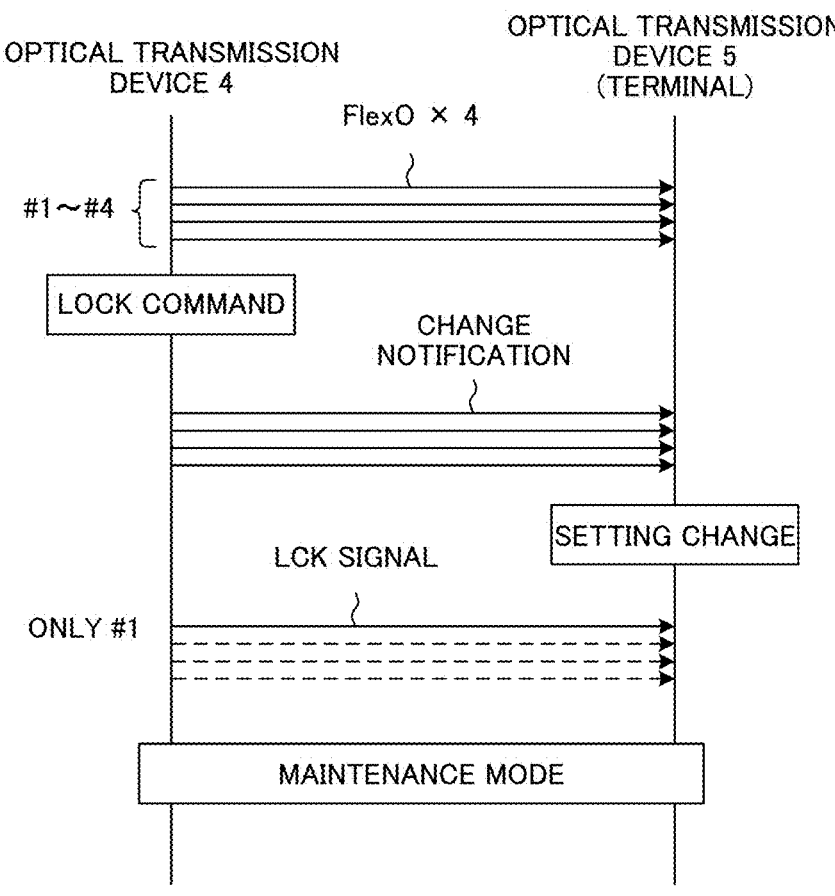
FIG. 15 illustrates an example of a sequence for changing a FlexO group.

FIG. 15 illustrates an example of a sequence of changing a FlexO group. In this example, four FlexO interfaces are defined as one group. As an example, the optical transmission system transmits an ODUC4 frame by using FlexO interfaces #1 to #4. In this case, the ODUC4 frame is accommodated in four FlexO frames. Then, the four Flexo frames are transmitted in parallel through the Flexo interfaces #1 to #4.

When starting maintenance of the ODU path, the operator gives the LOCK command to an optical transmission device 4. The optical transmission device 4 corresponds to the optical transmission device 2 illustrated in FIG. 6, the optical transmission device 2B illustrated in FIG. 11, or the optical transmission device 2C illustrated in FIG. 13. In addition, an optical transmission device 5 is provided at an end of the ODU path and corresponds to the optical transmission device 3 illustrated in FIGS. 7A to 7C.

The optical transmission device 4 transmits a change notification indicating that the number of Flexo interfaces to be used is changed from "4" to "1" to the optical transmission device 5. This change notification is an example of information indicating that a specified bit pattern (that is, the LCK signal) is transmitted by one transmission circuit among the plurality of transmission circuits. In addition, this change notification may be realized by using the overhead of the FlexO frame.

Figure 16:
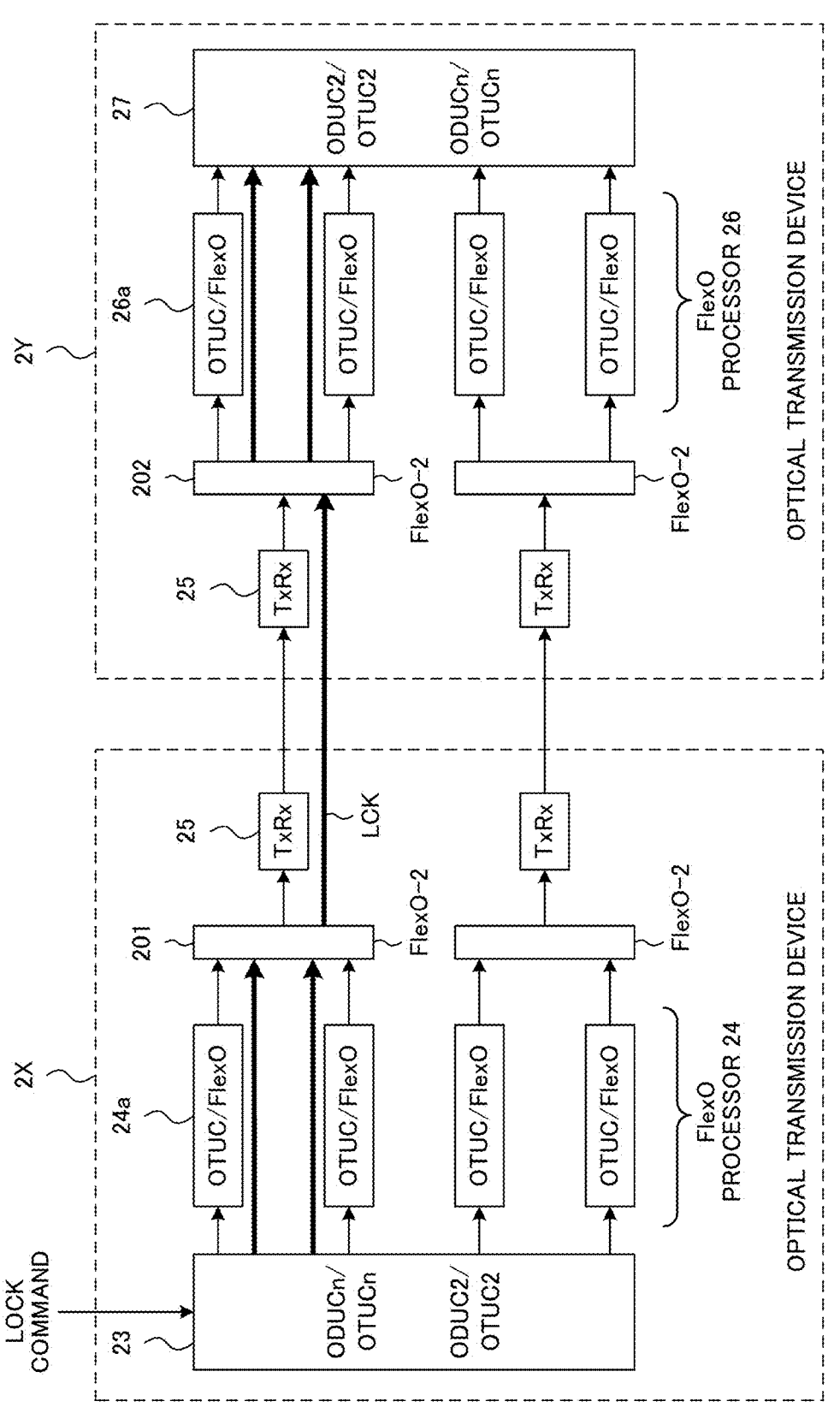
FIG. 16 illustrates an example in which the LCK signal is transmitted in the configuration illustrated in FIG. 3.

FIG. 16 illustrates an example in which the LCK signal is transmitted in the configuration illustrated in FIG. 3. The transmission circuit includes a FlexO-x processor 201 in addition to the configuration illustrated in FIG. 9. The reception circuit includes a FlexO-x processor 202 in addition to the configuration illustrated in FIG. 9. The FlexO-x processor 201 interleaves and multiplexes the Flexo frames generated by the OTUC/FlexO processor 24 to generate the FlexO-x frame. The FlexO-x processor 202 restores x FlexO frames from the FlexO-x frame. It is noted that, in the example illustrated in FIG. 16, x is 2 and n is 4.

Upon receiving the LOCK command, the ODUCn/OTUCn processor 23 switches its own operation mode from "n" to "n/x". That is, the ODUCn/OTUCn processor 23 operates as an ODUC2/OTUC2 circuit. In addition, the LCK signal is written in a payload of an ODUC2 frame.

The optical transmission device 2X transmits the ODUC2 frame to the optical transmission device 2Y. In this example, after the ODUC2 frame is accommodated in the OTUC2 frame, the ODUC2 frame is accommodated in two FlexO frames by two OTUC/FlexO processors 24a. These FlexO frames are multiplexed by the Flexo-2 processor 201 and then transmitted from the optical transmission device 2X to the optical transmission device 2Y. At this time, two of the four OTUC/FlexO processors 24a are used, and one of the two transceivers 25 is used. That is, in the optical transmission device 2X, each of the two OTUC/FlexO processors 24a and the one transceiver 25 are configured to be the non-operating state. The non-operating state indicates, for example, a state in which no signal is processed, a state in which no signal is input, a sleep state, or a state in which no power is supplied.

In the optical transmission device 2Y, the FlexO-2 frame is reproduced from the received signal, and the FlexO-2 processor 202 extracts two FlexO frames from the FlexO-2 frame. Each of the two OTUC/Flexo processor 26a reproduces the OTUC1 frame from the FlexO frame. Further, the ODUC1 frame is reproduced from each OTUC1 frame. Here, as described above, the optical transmission device 2X transmits the FlexO-2 frame by using one of the plurality of transceivers 25. Accordingly, in the optical transmission device 2Y, the corresponding one of the plurality of transceivers 25 receives the optical signal. In addition, two of the plurality of OTUC/Flexo processors 26a extract the OTUC1 frame from the FlexO frame. That is, in the optical transmission device 2Y, each of the two OTUC/FlexO processors 26a and the one transceiver 25 are configured to be the non-operating state.

Thereafter, the ODUCn/OTUCn processor 27 reconfigures the ODUCn frame from the ODUC2 frame. Here, the bit pattern of the LCK signal is known. Therefore, the ODUCn/OTUCn processor 27 can reproduce the ODUCn frame transmitted from the optical transmission device 2X by writing the LCK signal in the entire payload of the ODUCn frame. The overhead of the ODUCn frame may be the same as the overhead of the ODUC2 frame. Then, upon detecting the LCK signal from the payload of the ODUCn frame, the optical transmission device 2Y recognizes that maintenance of the ODU path is performed, and locks processing related to the ODU path.

Figures 17A, 17B:
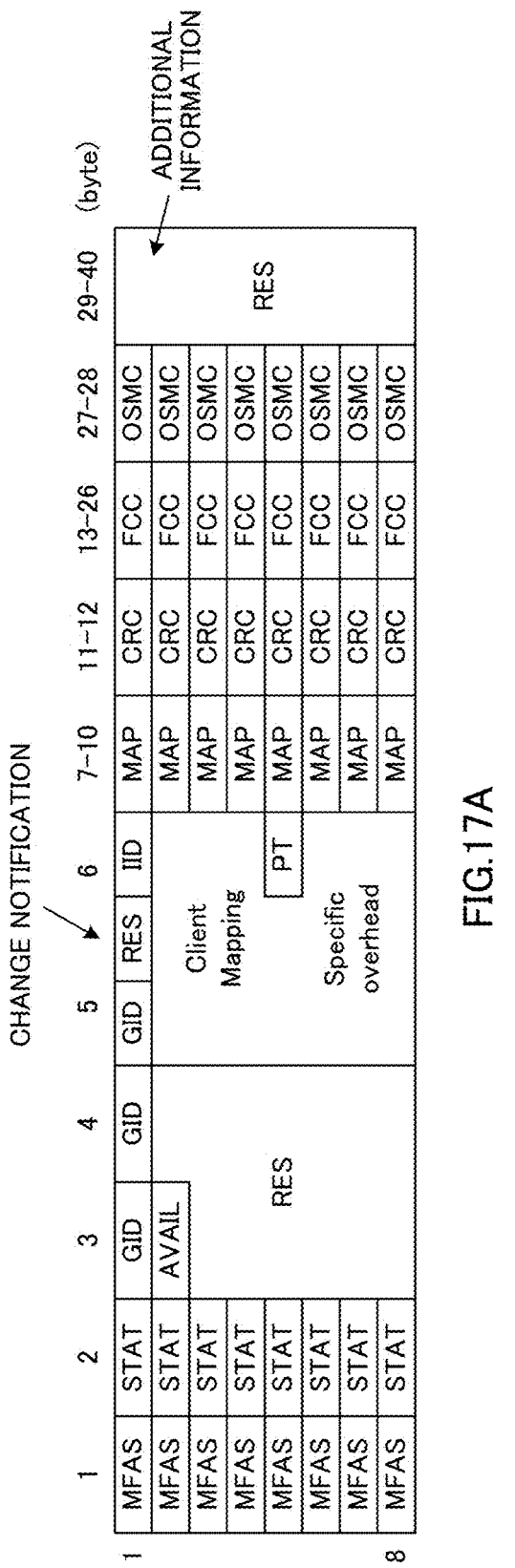
FIGS. 17A and 17B illustrate examples of overheads of a Flexo.

FIGS. 17A and 17B illustrate overheads of the FlexO. FIG. 17A represents a basic overhead (BOH) for a FlexO interface #1, and FIG. 17B represents a BOH for FlexO interfaces #2 to #n. The structure of the BOH is 8×40 bytes. In addition, the BOH is transmitted by multiframes. It is noted that the BOH is described in G709.1/Y.1331.1 (18)-Amd.3(22)_FIG. 9-7. In addition, in the embodiment of the present disclosure, since x=1 is assumed, it is described with reference to FIG. 9-7a, but the same applies to the case of adopting FIG. 9-7b (that is, x>1).

The change notification is implemented by using a reserved bit in the BOH. For example, the change notification is implemented using a specified bit in the reserved bits RES provided in the fifth to sixth bytes of the first bit. In this case, for example, "0" is set during normal communication, and "1" is set when the LCK signal is transmitted.

The change notification may include additional information. The additional information specifies the Flexo interface that transmits the LCK signal. That is, the additional information identifies the transmission circuit that transmits the LCK signal. Here, the LCK signal is transmitted by using, for example, the Flexo interface identified by a smallest value as a default setting. That is, when the FlexO group includes the FlexO interfaces #1 to #n, the LCK signal is transmitted by using only the Flexo interface #1. However, the operator may select a desired interface.

The additional information for the Flexo interface #1 includes the following information.

(1) IID (FlexO Interface Identification) identifying the interface #1.

(2) IID identifying an interface used to transmit the LCK signal (3) IID identifying an interface not used to transmit the LCK signal For example, when the LCK signal is transmitted only through the Flexo interface #1 in response to the LOCK command, the additional information (2) represents the interface #1, and the additional information (3) represents the interfaces #2 to #4. However, the LCK signal may be transmitted through another interface. For example, when transmitting the LCK signal only through the FlexO interface #2, the additional information (2) represents the interface #2, and the additional information (3) represents the interfaces #1, #3, and #4. It is noted that the additional information is also transmitted using the reserved bits in the BOH. For example, the additional information may be transmitted using the reserved bits RES provided in the 29th to 40th bytes.

The additional information does not necessarily need to be set for the FlexO interfaces #2 to #n (in the example, #2 to #4). When the additional information is configured for the Flexo interfaces #2 to #n, the additional information for the FlexO interface #1 may be the same.

The above-described change notification is preferably repeatedly transmitted a specified number of times (for example, three times). Then, when receiving the change notification, the optical transmission device 5 configures a circuit that does not receive the FlexO frame to be the non-operating state based on the additional information. For example, in the optical transmission system illustrated in FIG. 9, it is assumed that the LCK signal is transmitted only through the FlexO interface #1. In this case, the optical transmission device 2Y that receives the change notification configures the reception circuits of the respective transceivers 25 corresponding to the FlexO interfaces #2 to #4 and the OTUC/Flexo processors 26a corresponding to the Flexo interfaces #2 to #4 to be the non-operating state. Further, the ODUCn/OTUCn processor 27 is configured to reconfigure the ODUCn frame from one FlexO frame.

Thereafter, the optical transmission device 4 transmits the LCK signal only through the FlexO interface #1. At this time, the optical transmission device 4 configures a circuit that does not transmit the LCK signal (that is, the FlexO frame) to be the non-operating state. For example, in the optical transmission system illustrated in FIG. 9, it is assumed that the LCK signal is transmitted only through the FlexO interface #1. In this case, the optical transmission device 2X configures the transmission circuits of the transceivers 25 respectively corresponding to the FlexO interfaces #2 to #4 and the OTUC/FlexO processors 24a respectively corresponding to the FlexO interfaces #2 to #4 to be the non-operating state.

Figure 18:
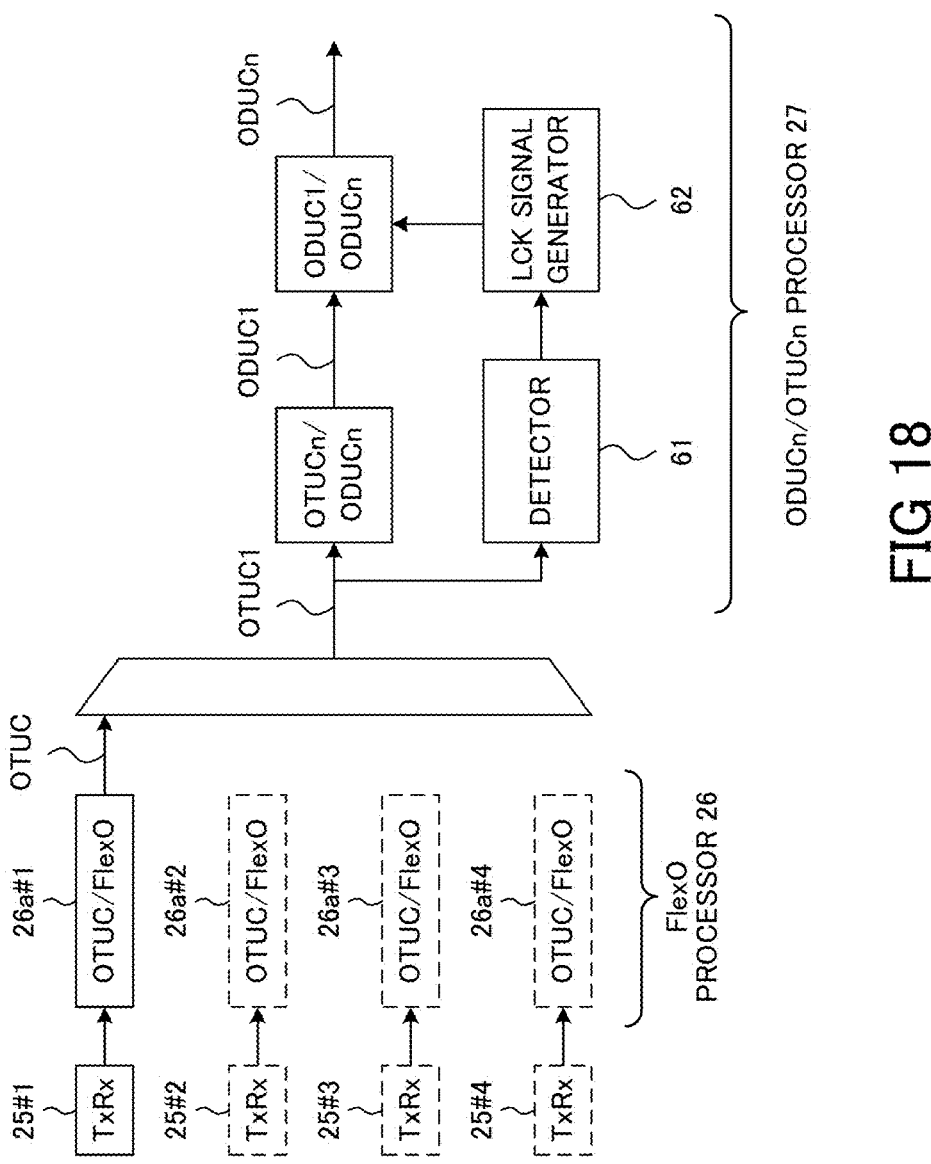
FIG. 18 illustrates an example of an operation of the optical transmission device that has received a change notification.

FIG. 18 illustrates an example of the operation of the optical transmission device 5 that has received the change notification. In this example, the optical transmission device 5 includes transceivers 25 #1 to 25 #4. Further, the FlexO processor 26 includes OTUC/FlexO processors 26a #1 to 26a #4. Then, the optical transmission device 5 receives the change notification and the additional information indicating that the FlexO interface #1 is used.

In this case, the reception circuit of each of the transceivers 25 #2 to 25 #4 and each of the OTUC/FlexO processors 26a #2 to 26a #4 are configured to be the non-operating state. The OTUC/FlexO processor 26a #1 reproduces the FlexO frame from the received signal, and extracts the OTUC frame from the FlexO frame. Here, during normal communication, the OTUC4 frame is configured by multiplexing the OTUC frames extracted by the OTUC/Flexo processors 26a #1 to 26a #4. However, the OTUC/FlexO processors 26a #2 to 26a #4 are in the non-operating state. Therefore, the OTUC1 frame is configured.

The ODUCn/OTUCn processor 27 extracts the ODUC1 frame from the OTUC1 frame. Further, the ODUCn/OTUCn processor 27 reconfigures the ODUC4 frame from the ODUC1 frame. At this time, a detector 61 a checks whether specified bit pattern representing the LCK signal is stored in the payload of the OTUC1 frame. When the specified bit pattern is detected, an LCK signal generator 62 generates a bit pattern representing the LCK signal. The ODUCn/OTUCn processor 27 writes the bit pattern generated by the LCK signal generator 62 in the payload of the ODUC4 frame. It is noted that the overhead of the ODUC4 frame can use the overhead of the ODUC1 frame as it is.

As described above, according to the embodiment of the present disclosure, in the optical transmission system that transmits a plurality of Flexo frames in parallel through a plurality of interfaces, the LCK signal for locking the ODU path is transmitted through only one interface. At this time, circuits corresponding to other interfaces are configured to be the non-operating state. Therefore, power consumption of each optical transmission device is reduced as compared with the configuration illustrated in FIGS. 4 and 5.

Variation 1

In the examples illustrated in FIGS. 6 to 18, when the operator of the optical transmission system inputs the LOCK command to the optical transmission device, transmission of the LCK signal using only one path (that is, one Flexo interface) is started. On the other hand, an optical transmission device according to Variation 1 can start transmission of the LCK signal using only one path without receiving an instruction from the operator.

Figure 19:
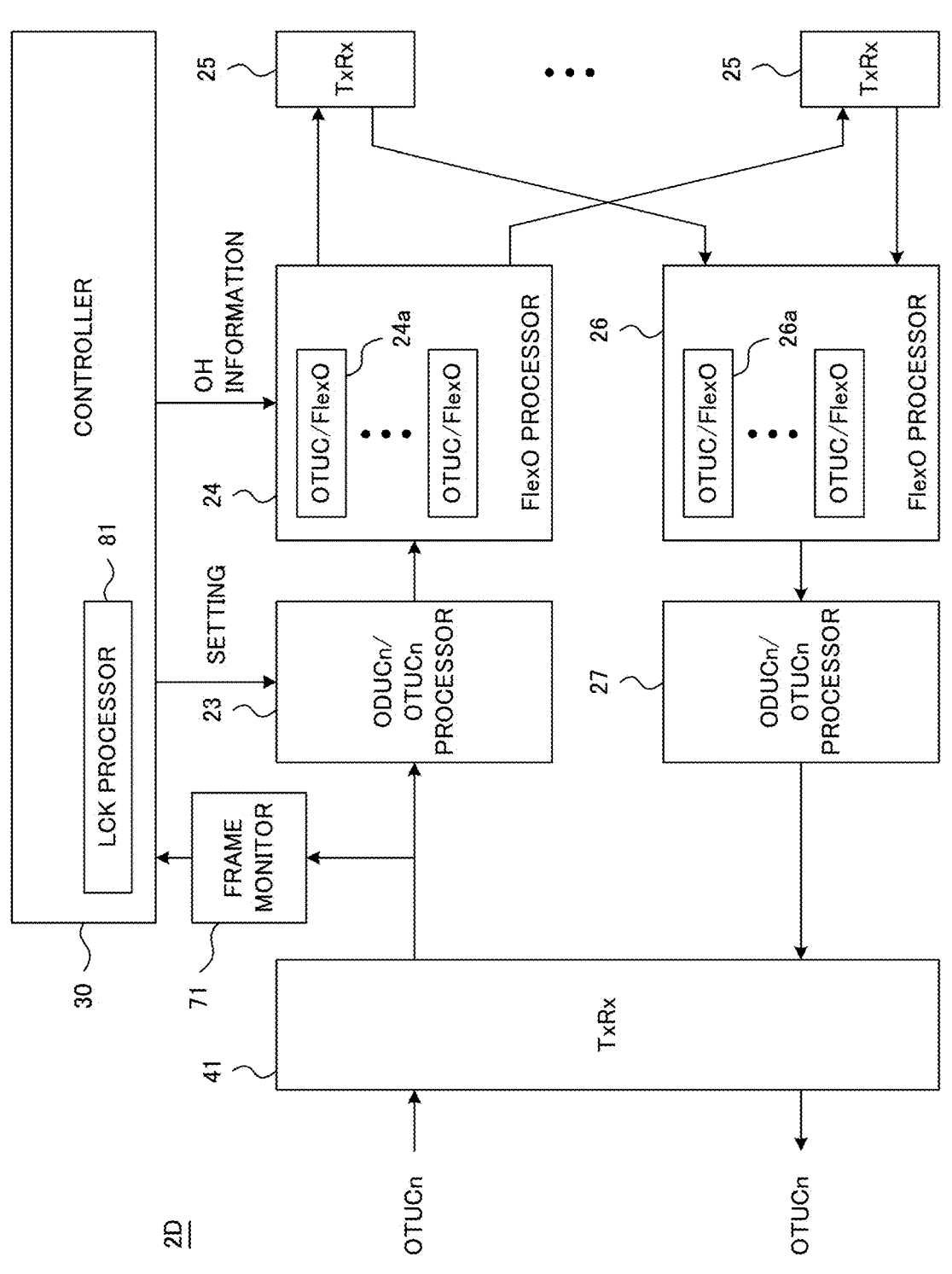
FIG. 19 illustrates an example of an optical transmission device according to Variation 1.

FIG. 19 illustrates an example of the optical transmission device according to the Variation 1. An optical transmission device 2D according to the Variation 1 is provided in the relay node similarly to the optical transmission device 2B illustrated in FIG. 7B or FIG. 11. That is, one of the two communication interfaces included in the optical transmission device 2D supports the Flexo, but the other communication interface does not support the FlexO.

The configuration of the optical transmission device 2D is substantially the same as that of the optical transmission device 2B illustrated in FIG. 11. However, the optical transmission device 2D includes a frame monitor 71. The frame monitor 71 monitors the overhead of the OTUCn frame in the received signal. When frame synchronization is established by detecting the overhead of the OTUCn frame, the frame monitor 71 guides the OTUCn frame to the controller 30.

The controller 30 includes an LCK processor 81. The LCK processor 81 extracts the ODUCn frame from the OTUCn frame, and checks whether a bit pattern representing the LCK signal is stored in the payload. When the LCK signal is detected in the payload of the ODUCn frame, the LCK processor 81 executes LCK process. This LCK process is substantially the same as the operation of the optical transmission device to which the LOCK command is given in the examples illustrated in FIGS. 6 to 18. That is, the LCK processor 81 changes the configuration of the ODUCn/OTUCn processor 23 so as to operate as the ODUC1/OTUC1 circuit. In addition, the LCK processor 81 provides the FlexO processor 24 with information to be written in the overhead of the FlexO. This information includes the change notification and the additional information described with reference to FIG. 17A or FIG. 17B. Further, the LCK processor 81 configures the OTUC/Flexo processor 26a and the transceiver 25 that do not transmit the LCK signal to be the non-operating state.

Variation 2

In the example illustrated in FIGS. 6 to 18, the optical transmission device transmits the LCK signal. However, the embodiment of the present disclosure is not limited to the configuration of transmitting the LCK signal. That is, the embodiments of the present disclosure are applicable to a configuration in which a known bit pattern is transmitted by using the FlexO frame.

Figure 20:
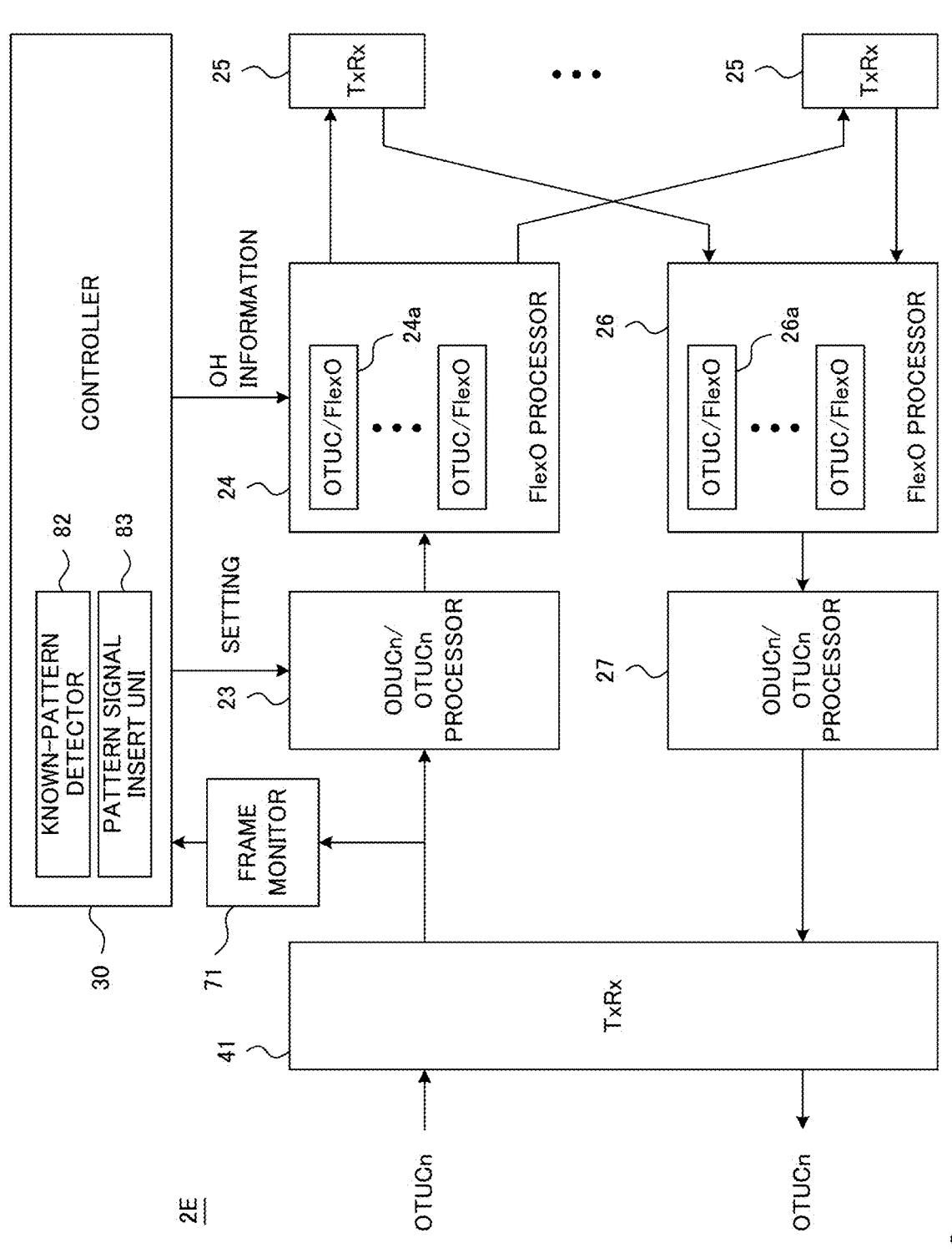
FIG. 20 illustrates an example of an optical transmission device according to Variation 2.

FIG. 20 illustrates an example of an optical transmission device according to Variation 2. An optical transmission device 2E according to the Variation 2 is provided in the relay node similarly to the optical transmission device 2D illustrated in FIG. 19. In addition, one of the two included in the optical transmission communication interfaces device 2E supports the Flexo, but the other communication interface does not support the Flexo. When frame synchronization is established, the frame monitor 71 guides the OTUCn frame to the controller 30.

The controller 30 includes a known-pattern detector 82 and a pattern signal insert unit 83. The known-pattern detector 82 checks whether a bit pattern designated in advance is stored in the payload of the received frame. As an example, the known-pattern detector 82 detects an alarm indication signal (AIS) which is one of OTUk maintenance signals. The AIS is implemented by, for example, a PN-11 sequence. Alternatively, the known-pattern detector 82 may detect a pseudo random binary sequence (PRBS) test signal. When the designated bit pattern is detected by the known-pattern detector 82, the controller 30 starts a procedure of transmitting a specified signal using only one path (that is, one Flexo interface), similarly to the optical transmission device to which the LOCK command is given in the example illustrated in FIGS. 6 to 18. At this time, the pattern signal insert unit 83 instructs the ODUCn/OTUCn processor 23 to insert a known pattern into a transmission frame.

For example, when the known-pattern detector 82 detects the AIS, the pattern signal insert unit 83 instructs the ODUCn/OTUCn processor 23 to write the PN-11 sequence in the payload of the OTUCn frame. However, in this example, the ODUCn/OTUCn processor 23 is configured to operate as the ODUC1/OTUC1 circuit. Therefore, the ODUCn/OTUCn processor 23 generates the OTUC1 frame in which PN-11 is written in the payload. Then, the OTUC1 frame is transmitted using the Flexo frame. At this time, the optical transmission device 2E transmits the Flexo frame by using only one FlexO interface.

Variation 3

Figure 21:
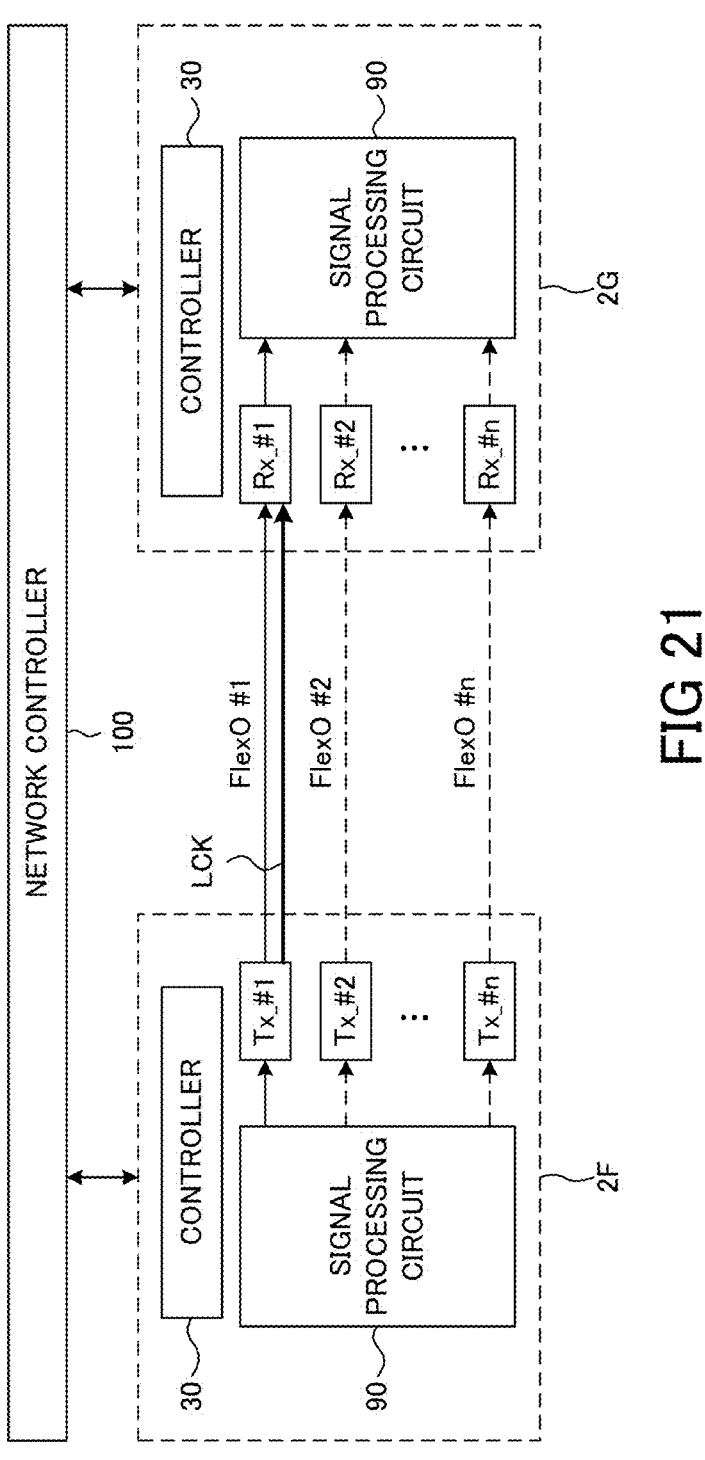
FIG. 21 illustrates an example of an optical transmission system according to Variation 3.

FIG. 21 illustrates an example of an optical transmission system according to Variation 3. In this example, the optical transmission system includes an optical transmission device 2F, an optical transmission device 2G, and a network controller 100. The optical transmission devices 2F and 2G correspond to the optical transmission device 2 illustrated in FIG. 6, the optical transmission device 2B illustrated in FIG. 11, or the optical transmission device 2C illustrated in FIG. 13. It is noted that, when the optical transmission devices 2F and 2G correspond to the optical transmission device 2 illustrated in FIG. 6, a signal processing circuit 90 corresponds to the client processors 21 and 29, the OPUCn processors 22 and 28, the ODUCn/OTUCn processors 23 and 27, and the Flexo processors 24 and 26. The network controller 100 manages each optical transmission device (2F, 2G).

Data is transmitted between the optical transmission devices 2F and 2G using a plurality of paths (FlexO #1 to #n). That is, the ODUCn frames are transmitted in parallel by using n FlexO frames.

When maintenance of the optical transmission system having the above-described configuration is performed, the LCK signal is transmitted. In this example, the LCK signal is transmitted from the optical transmission device 2F to the optical transmission device 2G. The LCK signal is transmitted through one path, as described with reference to FIGS. 6 to 18. In FIG. 21, the LCK signal is transmitted through the FlexO #1. At this time, circuits respectively corresponding to other paths (that is, FlexO #2 to #n) are configured to be the non-operating state.

Figures 22A, 22B:
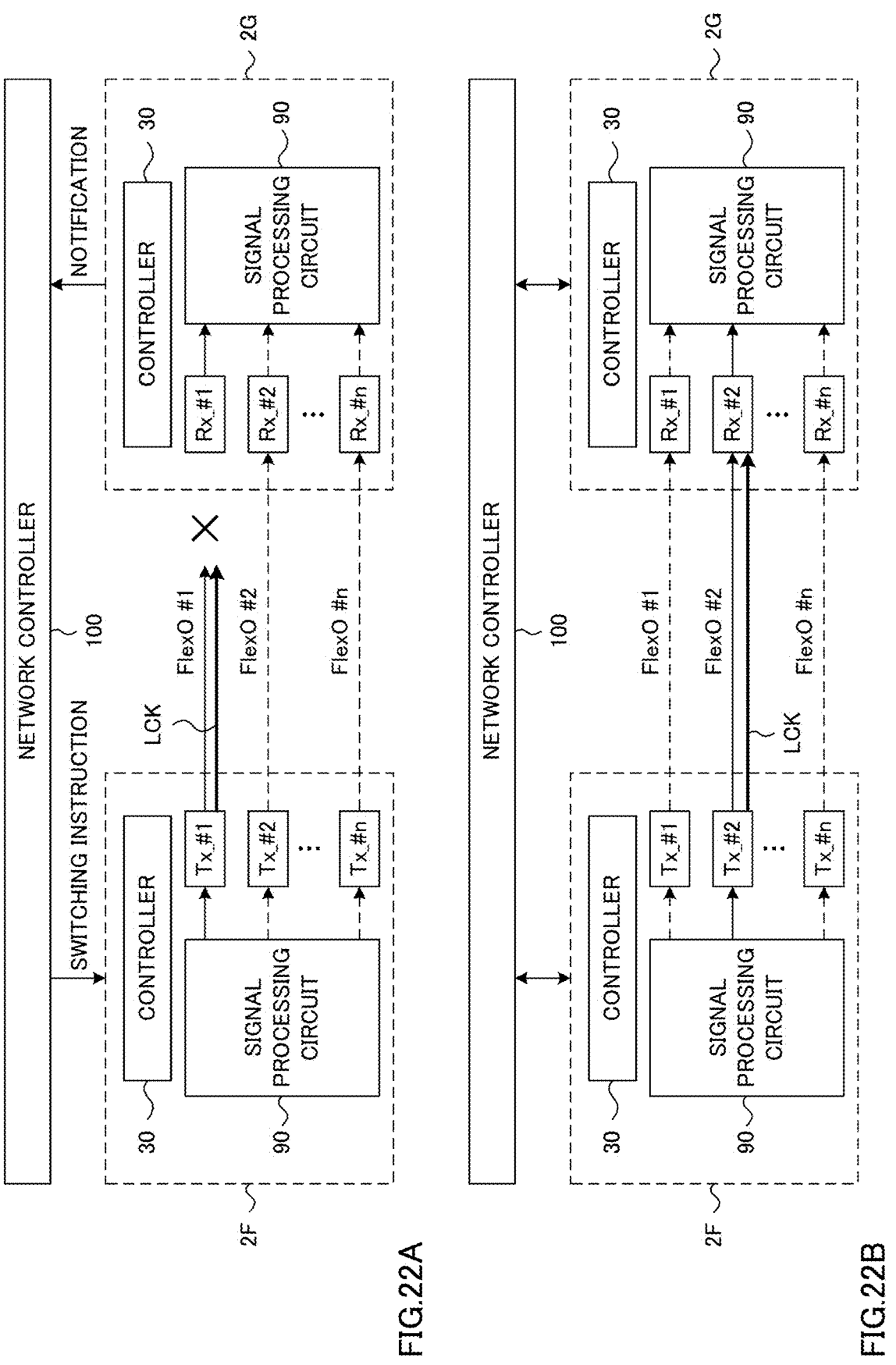
FIGS. 22A and 22B illustrate an example of a procedure for recovering a failure.

When a failure occurs in a path that transmits the LCK signal during LOCK operation, the LCK signal is transmitted through another path. For example, in the example illustrated in FIG. 22A, a fault occurs in the Flexo #1 that transmits the LCK signal. In this case, when detecting a loss of light (LOL), a loss of signal (LOS), or a loss of frame (LOF) in the FlexO #1, the optical transmission device 2G notifies the network controller 100 that a failure has occurred in the Flexo #1. Then, the network controller 100 instructs a transmission source (that is, the optical transmission device 2F) of the LCK signal to switch the path that transmits the LCK signal. As a result, the optical transmission device 2F switches the path that transmits the LCK signal. In the example illustrated in FIG. 22B, the LCK signal is transmitted through the Flexo #2. At this time, the optical transmission device 2F uses the additional information described with reference to FIG. 17A or FIG. 17B to notify the optical transmission device 2G that the LCK signal is transmitted through the FlexO #2.

As described above, according to the Variation 3, even when a failure occurs in the path that transmits the LCK signal, the LCK signal can be transmitted to a node at the end of the ODU path. It is noted that the Variation 3 is not limited to the LCK signal, and is also applicable to other signals (for example, AIS).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission device used in an optical transmission system that transmits a frame, the optical transmission device comprising:
   a first frame generator configured to generate a first frame;
   a second frame generator configured to generate one or a plurality of second frames from the first frame, the number of the second frames corresponding to a bandwidth of the first frame; and a plurality of transmission circuits configured to transmit the second frames generated by the second frame generator, wherein
   when a specified bit pattern is transmitted to a second optical transmission device,
      the first frame generator generates a third frame including the specified bit pattern, a bandwidth of the third frame being equal to or smaller than a bandwidth of the second frame,
      the second frame generator generates a fourth frame having the same format as a format of the second frame, the third frame being accommodated in the fourth frame, and
      the fourth frame is transmitted to the second optical transmission device by a first transmission circuit selected from the plurality of transmission circuits.

2. The optical transmission device according to claim 1, wherein
   when the first transmission circuit transmits the fourth frame, the other transmission circuits among the plurality of transmission circuits are each configured to be a non-operating state.

3. The optical transmission device according to claim 1, wherein
   an overhead of the fourth frame includes information indicating that the specified bit pattern is transmitted by one of the plurality of transmission circuits.

4. The optical transmission device according to claim 3, wherein
   The overhead of the fourth frame includes information identifying the first transmission circuit.

5. The optical transmission device according to claim 1, wherein
   when the specified bit pattern is detected in a received optical signal from a third optical transmission device, the first frame generator generates the third frame, and the second frame generator generates the fourth frame.

6. The optical transmission device according to claim 1, wherein
   the fourth frame is a flexible OTN (FlexO) frame used in an optical transport network (OTN).

7. An optical transmission system in which a frame is transmitted between a first optical transmission device and a second optical transmission device, wherein
   the first optical transmission device includes:
      a first frame generator configured to generate a first frame;
      a second frame generator configured to generate one or a plurality of second frames from the first frame, the number of the second frames corresponding to a bandwidth of the first frame; and
      a plurality of transmission circuits configured to transmit the second frames generated by the second frame generator, wherein
   when a specified bit pattern is transmitted from the first optical transmission device to the second optical transmission device,
      the first frame generator generates a third frame including the specified bit pattern, a bandwidth of the third frame being equal to or smaller than a bandwidth of the second frame,
      the second frame generator generates a fourth frame having the same format as a format of the second frame, the third frame being accommodated in the fourth frame, and the fourth frame is transmitted to the second optical transmission device by a first transmission circuit selected from the plurality of transmission circuits, wherein the second optical transmission device includes:

a plurality of reception circuits; and a third frame generator configured to reconfigure the first frame from the fourth frame received by one of the plurality of reception circuits, wherein the third frame generator writes the specified bit pattern in a payload of the reconfigured first frame.

8. The optical transmission system according to claim 7, wherein when a failure of a path configured to transmit the fourth frame is detected, the second optical transmission device notifies a network controller that the failure has occurred, and the first optical transmission device transmits, in response to an instruction from the network controller, the fourth frame to the second optical transmission device by using a second transmission circuit among the plurality of transmission circuits.

\* \* \* \* \*